(12) United States Patent
Van Luchene et al.

(10) Patent No.: US 8,046,265 B2
(45) Date of Patent: Oct. 25, 2011

(54) SYSTEMS AND METHODS FOR FACILITATING A TRANSACTION BY MATCHING SELLER INFORMATION AND BUYER INFORMATION

(75) Inventors: Andrew S. Van Luchene, Norwalk, CT (US); John C. Caine, Ivoryton, CT (US); Kathleen Van Luchene, Norwalk, CT (US); Michiko Kobayashi, Stamford, CT (US); Ronald E. Zepp, II, Winston, GA (US); Robert J. Anderson, Smyrna, GA (US)

(73) Assignee: Walker Digital, LLC, Stamford, CT (US)

( * ) Notice: Subject to any disclaimer, the term of this patent is extended or adjusted under 35 U.S.C. 154(b) by 980 days.

(21) Appl. No.: 11/746,696

(22) Filed: May 10, 2007

(65) Prior Publication Data

US 2007/0208635 A1 Sep. 6, 2007

Related U.S. Application Data

(62) Division of application No. 09/586,742, filed on Jun. 5, 2000, now abandoned.

(60) Provisional application No. 60/176,158, filed on Jan. 14, 2000.

(51) Int. Cl.
*G06Q 30/00* (2006.01)

(52) U.S. Cl. .................................................... 705/26.1

(58) Field of Classification Search .............. 705/26, 705/26.1–27.2
See application file for complete search history.

(56) References Cited

U.S. PATENT DOCUMENTS 4,903,201 A 2/1990 Wagner .......................... 364/408

(Continued)

FOREIGN PATENT DOCUMENTS

EP 0 858 057 A2 8/1998

(Continued)

OTHER PUBLICATIONS

"Material Handling Update: IMI Enhances Its Logistics Management and Customer Service Software," Sep. 1994; Manufacturing Automation , v 3 , n 12, 3pp.*

(Continued)

*Primary Examiner* — Adam Levine
(74) *Attorney, Agent, or Firm* — Magdalena M. Fincham; Fincham Downs, LLC

(57) ABSTRACT

A method is provided to facilitate a transaction between a seller and a buyer. Buyer information regarding a desired product is received. A controller then searches through a plurality of seller database records associated with products offered for sale by sellers, for a seller database record that corresponds to the buyer information. Based on the searching a determination is made that no seller database record corresponds to the buyer information. Upon determination that no seller database record corresponds to the buyer information the buyer submits additional information defining a commitment to purchase the product. This information indicating a quality associated with the desired product and a maximum price that the buyer commits to pay. After receiving this information a new seller database record is created with a specific product offered for sale by a specific seller that corresponds with the additional buyer information, and the buyer is automatically charged for the specific product. According to other embodiments, an appropriate item price is determined based on the seller offer information. According to another embodiment, a subsidy is determined, the subsidy being associated with a benefit from a subsidy provider to be applied to the transaction. In this case, it is arranged for the seller to provide the item to the buyer in accordance with the benefit. A seller offer and or a buyer offer may be binding, and a penalty may be applied if a seller and or a buyer does not complete a transaction.

26 Claims, 26 Drawing Sheets

U.S. PATENT DOCUMENTS

| | | | |
|---|---|---|---|
| 4,992,940 A | 2/1991 | Dworkin | 364/401 |
| 5,006,983 A | 4/1991 | Wayne et al. | 364/401 |
| 5,136,501 A | 8/1992 | Silverman et al. | 364/408 |
| 5,283,731 A | 2/1994 | Lalonde et al. | 364/401 |
| 5,426,281 A | 6/1995 | Abecassis | 235/379 |
| 5,459,859 A | 10/1995 | Senda | 395/600 |
| 5,500,793 A | 3/1996 | Deming, Jr. et al. | 364/401 |
| 5,557,518 A | 9/1996 | Rosen | 364/408 |
| 5,592,375 A * | 1/1997 | Salmon et al. | 705/321 |
| 5,615,269 A | 3/1997 | Micali | 380/49 |
| 5,638,519 A | 6/1997 | Haluska | 395/228 |
| 5,664,115 A | 9/1997 | Fraser | 705/37 |
| 5,671,280 A | 9/1997 | Rosen | 380/24 |
| 5,675,784 A | 10/1997 | Maxwell et al. | 395/611 |
| 5,689,652 A | 11/1997 | Lupien et al. | 395/237 |
| 5,715,402 A | 2/1998 | Popolo | 395/237 |
| 5,717,989 A | 2/1998 | Tozzoli et al. | 705/37 |
| 5,745,882 A | 4/1998 | Bixler et al. | 705/26 |
| 5,754,939 A | 5/1998 | Herz et al. | 455/4.2 |
| 5,794,207 A | 8/1998 | Walker et al. | 705/1 |
| 5,799,151 A | 8/1998 | Hoffer | 395/34 |
| 5,835,087 A | 11/1998 | Herz et al. | 345/327 |
| 5,842,178 A | 11/1998 | Giovannoli | 705/26 |
| 5,845,265 A | 12/1998 | Woolston | 705/37 |
| 5,873,071 A | 2/1999 | Ferstenberg et al. | 705/37 |
| 5,878,139 A | 3/1999 | Rosen | 380/24 |
| 5,913,210 A | 6/1999 | Call | 705/4 |
| 5,924,082 A | 7/1999 | Silverman et al. | 705/37 |
| 5,933,813 A | 8/1999 | Teicher et al. | 705/26 |
| 5,940,807 A | 8/1999 | Purcell | 705/26 |
| 5,946,388 A | 8/1999 | Walker et al. | 379/266 |
| 5,950,172 A | 9/1999 | Klingman | 705/26 |
| 5,950,177 A | 9/1999 | Lupien et al. | 705/37 |
| 5,974,406 A | 10/1999 | Bisdikian et al. | 707/1 |
| 6,012,925 A | 1/2000 | Kelly et al. | 434/107 |
| 6,055,519 A | 4/2000 | Kennedy et al. | 705/80 |
| 6,131,087 A | 10/2000 | Luke et al. | 705/26 |
| 6,154,738 A * | 11/2000 | Call | 1/1 |
| 6,202,051 B1 | 3/2001 | Woolston | 705/27 |
| 6,236,972 B1 | 5/2001 | Shkedy | 705/1 |
| 6,243,691 B1 | 6/2001 | Fisher et al. | 705/37 |
| 6,332,129 B1 | 12/2001 | Walker et al. | 705/26 |
| 6,338,050 B1 | 1/2002 | Conklin et al. | 705/80 |
| 6,397,197 B1 | 5/2002 | Gindlesperger | 705/37 |
| 6,415,320 B1 | 7/2002 | Hess et al. | 709/219 |
| 6,453,306 B1 | 9/2002 | Quelene | 705/80 |
| 6,470,323 B1 * | 10/2002 | Suzuki et al. | 705/27 |
| 6,598,026 B1 | 7/2003 | Ojha et al. | 705/26 |
| 6,598,027 B1 | 7/2003 | Breen et al. | 705/26 |
| 7,366,684 B1 | 4/2008 | Douglas | 705/26 |
| 7,366,686 B2 | 4/2008 | Azuma | 705/26 |
| 2003/0083961 A1 * | 5/2003 | Bezos et al. | 705/27 |

FOREIGN PATENT DOCUMENTS

| | | |
|---|---|---|
| EP | 0 947 939 A2 | 6/1999 |
| WO | WO 94/23383 | 10/1994 |

OTHER PUBLICATIONS

Evans, John; "A good deal less painful: [1GS Edition]"; Sunday Times; London; Oct. 24, 1999; p. 23; extracted on Internet from (http://proquest.umi.com) on Feb. 9, 2004, 2 pg.

Copeland and Lamm, ed., "The Everyday Reference Library—An Encyclopedia of Useful Information", 1953, pp. 942-957.

Ryu,Y.U., Hong S.; "A Computational Model of Continuous Trading In Auction Markets;"A Parallel, Expert System Approach; Copyright 1998; New Review of Applied Expert Systems vol. 4, pp. 33-45; Taylor Graham Publishing.

Jackson, Tim; "Trade by Blind Date: An Israeli Company Has Developed an Electronic Noticeboard That Matches Buyers and Sellers Automatically"; Financial Times, Insider Track; Jun. 1, 1998; p. 15.

Spang, Kelly; "Virtual-Market Matchmaker (Online Computer Auction Format Is Discussed; Downside is That Resellers Must Wait Until The End of The Day to Find Out if Their Bids Were The Highest For a Particular Product"; Computer Reseller New, Jun. 1, 1998; p. 220.

One Step Beyond the Competition; "Visual Auction 3.0"; (http://www.beyondauction.com/auctionfeatures/); download date Apr. 27, 1999, 2 pp.

Excite: "Classified & Auctions"; (http://www.clasifieds2000.com/cgi...artner); download date Apr. 27, 1999, 37 pp.

Wilder, Clinton; "Web Marketplace to Bring Close-Out Industry Online-Startup To Match Buyers and Sellers of Discounted Overstock, Overruns, and Mislabeled Goods"; Dollardays.com is new company that targets $30 bil close-out products industry; is scheduled to go live with business-to-business webmarketplace early in 2000; Information Week, Oct. 25, 1999, p. 98; 8 pp.

Reuters; "Nasdaq Launches Optimark Trading System"; Oct. 11, 1999, 2 pp.

The Lobby Teleboard; "Your Ad Agents" (http://www.teleboard.com/cgi/issproc.exe); dowload date Dec. 14, 1999, 12 pp.

Author Unknown; "Best Offer.com Offers 'Free for All' Preview of Painless Way to Buy and Sell Used Cars; Unique Service Offers Used Car Buyers and Sellers Complete Solution", PR Newswire, Financial News Section; Dec. 14, 1999, 3 pp.

"New Derivatives System on The Australian Stock Exchange (ASX)"; (http://www.buttonwood.com/emliks/dir06-09.html); download date: Jan. 20, 2000, 1 pg.

"Experts Exchange, the #1 Knowledge Sharing Community on the Web.", (http://www.experts-exchange.com/info/different.htm); download date: Jan. 20, 2000, 1 pg.

"Home Exchange at the Premier International Vacation and Travel Home Exchange System", (http://www.homexchange.com.open.html); download date Jan. 20, 2000, 1 pg.

"Banner Ad Network: The Premier Network for Target Audience Marketing"; (http://www.banneradnetwork.com/); download date Jan. 20, 2000, 1 pg.

"About Internet Exchange Trading System"; (http://lets.hyperrnart.net/about.htm); download date Jan. 20, 2000, 1 pg.

"Pacific Exchange Gets SEC OK to Use OptiMark(TM) Trading System"; (http://www.optimark.com/press/scrapbook)dj091897.html); download date: Jan. 20, 2000, 1 pg.

"i-Escrow Inc.—User Benefits"; (http://www.iescrow.com/whatisescrow.html); download date: Jan. 20, 2000, 1 pg.

"eBay Help: Buyer Guide: Close the Deal: Now What?"; (http://www.pages.ebay.com/help/buyerguide/after-whatnow.html); download date: Jan. 20, 2000, 2 pp.

"eBay Help: Basics: New to eBay: Why eBay is Safe"; (http://pages.ebay.com/help/basics/n-is-ebay-safe.html); download date: Jan. 20, 2000, 2 pp.

"How Expert Central Works"; (http://expertcentral.com/how/); download date: Jan. 20, 2000, 3 pp.

"Auto Escrow, How it Works"; (http://www.carescrow.net/how-works/howitworks.htm); download date: Jan. 20, 2000, 1 pg.

"How Tradesafe Works for You"; (http://www.tradesafe.com/howitworks.cfm); download date: Jan. 20, 2000, 4 pp.

"Used Computer Exchange", How the Used Computer Exchange Works; (http://www.usedcomputerexchange.com/hiw/main.htm); download date: Feb. 9, 2000, 5 pp.

"Auction Services Help You Sell Online"; (http)/www.sell-n-net.com/faq.htm); download date: Feb. 10, 2000, 3 pp.

"Golf Club Exchange: Search & Bid"; (http://golfclubexchange.com/gee-howitworks.html); download date: Feb. 10, 2000, 17 pp.

"Auctions.com: BidSafe Tutorial"; (http://216.33.88.51/au/sharedcontent/...); download date: Feb. 10, 2000.

"Auctions.com: BidSafe Tutorial . . . Shipping"; (http://216.33.88.51/au/sharedcontent/...); download date: Feb. 10, 2000, 3 pp.

Untitled; "The Steps to a Successful Transaction"; (http://www.escrow.ca/serve.html); download date Feb. 10, 2000, 2 pp.

"Che.Match.com—How CheMatch.com Online Trading Works", The Better Way to Buy and Sell Commodity Chemicals; (http://www.chematch.com/colcsc/whatscomign/trading/text4.asp); download date Feb. 10, 2000, 1 pg.

"CheMatch.com—How Chematch.com Online Trading Works", Confidential online negotiations; (http://www.chematch.com/colcsc/whatscoming/trading/template.asp), download date Feb. 10, 2000, 1 pg.

Office Action for U.S. Appl. No. 11/421,823, dated Oct. 8, 2008, 7 pp.
Office Action for U.S. Appl. No. 12/498,035, dated Sep. 8, 2010, 18 pp.
Office Action for U.S. Appl. No. 11/421,824, dated Jun. 3, 2009, 6 pp.
Office Action for U.S. Appl. No. 11/421,824, dated Oct. 15, 2008, 7 pp.
Office Action for U.S. Appl. No. 11/421,829, dated Oct. 9, 2008, 7 pp.
Decision on Appeal for U.S. Appl. No. 09/586,742, dated Mar. 15, 2007, 28 pp.
Examiners Answer for U.S. Appl. No. 09/586,742, dated Aug. 10, 2006, 10 pp.
Notice of Panel Decision from Pre-Appeal Brief Review for U.S. Appl. No. 09/586,742, dated May 1, 2006, 2 pp.
Office Action for U.S. Appl. No. 09/586,742, dated Jan. 1, 2006, 10 pp.
Interview Summary for U.S. Appl. No. 09/586,742, dated Oct. 11, 2005, 2 pp.
Office Action for U.S. Appl. No. 09/586,742, dated Sep. 28, 2005, 7 pp.
Office Action for U.S. Appl. No. 09/586,742, dated Apr. 18, 2005, 15 pp.
Office Action for U.S. Appl. No. 09/586,742, dated Oct. 5, 2004, 34 pp.
Office Action for U.S. Appl. No. 09/586,742, dated Feb. 19, 2004, 32 pp.
Office Action for U.S. Appl. No. 09/586,742, dated Jul. 9, 2003, 4 pp.
U.S. Appl. No. 60/172,172, filed Dec. 17, 1999, now expired.

* cited by examiner

| BUYER IDENTIFIER 302 | BUYER NAME 304 | ADDRESS 306 | CONTACT IDENTIFIER 308 | ASSOCIATED OFFERS TO BUY 310 | PRIORITY RANKING 312 | PAYMENT IDENTIFIER 314 | ACCEPTED SUBSIDY OFFERS 316 | CURRENT BALANCE 318 |
|---|---|---|---|---|---|---|---|---|
| B-1111 | JAN ATEN | 10 MAIN ST. ANYTOWN, USA | JAN@AOL.COM | OTB-0000 OTB-3333 | 1 | 1111-1111-1111-1111 | CS-09876 | $13.00 |
| B-2222 | KRIS BLOCK | 12 OAK ST. ANYTOWN, USA | KRIS@MSN.COM | OTB-1111 | 2 | 2222-2222-2222-2222 | CS-98765 | $0.00 |
| B-3333 | LANCE LAMPHERE | 14 ELM STREET ANYTOWN, USA | LANCE@NYC.EDU | OTB-8585 OTB-6423 | 1 | 3333-3333-3333-3333 | --- | $25.00 |
| B-4444 | MAURY CALOT | 16 CABALLERO ST SOMETOWN, USA | MAURY@WEBTV.COM | OTB-0198 | 2 | 4444-4444-4444-4444 | --- | $15.50 |
| B-5555 | NATALIE LYDIE | 18 CALLE OJO SOMETOWN, USA | (505) 999-9999 | OTB-4444 | 2 | 5555-5555-5555-5555 | --- | $35.65 |

| SELLER IDENTIFIER 402 | SELLER NAME 404 | ADDRESS 406 | CONTACT IDENTIFIER 408 | ASSOCIATED OFFERS TO SELL 410 | PRIORITY RANKING 412 | PAYMENT IDENTIFIER 414 | ACCEPTED SUBSIDY OFFERS 416 | CURRENT BALANCE 418 |
|---|---|---|---|---|---|---|---|---|
| S-1111 | KEVIN OCKS | 10 TREE LANE SOMETOWN, USA | KEV@CCC.COM | OTS-3333 OTS-5555 | 1 | 7777-7777-7777-7777 | -- | $5.00 |
| S-2222 | KORBIN PARKER | 12 FLY RD ANYTOWN, USA | PARK@MSN.COM | OTS-0000 | 2 | 8888-8888-8888-8888 | CS-09876 | $14.00 |
| S-3333 | KYLA AGAPE | 14 BEE ST. ANYTOWN, USA | KYLA@AOL.COM | OTS-9999 OTS-5353 | 1 | 9999-9999-9999-9999 | -- | $0.00 |
| S-4444 | KELLY PROPRE | 16 ROPE RD SOMETOWN, USA | KELLY@YAHOO.COM | OTS-4983 | 1 | 0000-0000-0000-0000 | CS-98765 | $0.00 |
| S-5555 | KAMERON LOVE | 18 JADE PL. SOMETOWN, USA | KAM@9QUARTER.COM | OTS-2468 | 1 | 5454-5454-5454-5454 | -- | $32.00 |

FIG. 4

| OFFER TO BUY IDENTIFIER 502 | DATE RECEIVED 504 | ITEM CATEGORY 506 | MATCHING CODE 508 | QUALITY CLASS 510 | ASKING PRICE 512 | MAXIMUM PRICE 514 | STATUS 516 |
|---|---|---|---|---|---|---|---|
| OTB-0000 | 10/17/00 | I-C1111 | 999999999909 | BETTER | $60.00 | $90.00 | PENDING |
| OTB-1111 | 10/14/00 | I-C4444 | 689996669879 | GOOD | $100.00 | $150.00 | COMPLETE |
| OTB-2222 | 10/9/00 | I-C9999 | 999888777666 | BEST | $500.00 | $600.00 | FILLED |
| OTB-3333 | 9/10/00 | I-C4444 | 689996769897 | BEST | $60.00 | $70.00 | OPEN |
| OTB-4444 | 10/12/00 | I-C8888 | 121212121212 | GOOD | $25.00 | $30.00 | EXPIRED |

| OFFER TO SELL IDENTIFIER 602 | DATE RECEIVED 604 | ITEM CATEGORY 606 | MATCHING CODE 608 | QUALITY CLASS 610 | ASKING PRICE 612 | MINIMUM PRICE 614 | STATUS 616 |
|---|---|---|---|---|---|---|---|
| OTS-0000 | 10/15/00 | I-C1111 | 999990009000 | GOOD | $60.00 | $35.00 | PENDING |
| OTS-1111 | 10/16/00 | I-C1111 | 909999999090 | BETTER | $125.00 | $70.00 | PENDING |
| OTS-2222 | 10/14/00 | I-C1111 | 909090909090 | BEST | $210.00 | $175.00 | PENDING |
| OTS-3333 | 9/25/00 | I-C4444 | 689676767676 | BETTER | $100.00 | $75.00 | COMPLETE |
| OTS-4444 | 9/30/00 | I-C6666 | 575757575757 | BETTER | $25.00 | $20.00 | UNMATCHED |

| ITEM CATEGORY IDENTIFIER 702 | CATEGORY DESCRIPTION 704 |
|---|---|
| I-C111 | POINT AND SHOOT CAMERA |
| I-C222 | SINGLE-LENS REFLEX CAMERA |
| I-C333 | PORTABLE TELEVISION |
| I-C444 | MEDIUM SCREEN TELEVISION |
| I-C555 | LARGE SCREEN TELEVISION |

| ITEM CATEGORY IDENTIFIER I-C111 802 | | | |
|---|---|---|---|
| FEATURE 804 | GOOD CLASS 806 | BETTER CLASS 808 | BEST CLASS 810 |
| AUTOFOCUS | YES | YES | YES |
| AUTOFLASH | YES | YES | YES |
| AUTOWIND | YES | YES | YES |
| AUTOLOAD | --- | YES | YES |
| 2X ZOOM LENS | --- | YES | YES |
| 3X ZOOM LENS | ---- | ---- | YES |
| 4X ZOOM LENS | ---- | ---- | YES |
| BRAND: DINOLTA | YES | YES | --- |
| BRAND: TENTAX | YES | YES | --- |
| CONDITION: 1-5 YEARS OLD | YES | YES | --- |
| SUGGESTED PRICE RANGE | $35.00-$60.00 | $55.00-$125.00 | $115.00-$250.00 |

FIG. 8

| RULE CATEGORY IDENTIFIER 902 | RULE CATEGORY DESCRIPTION 904 | MATCHING PRIORITY 906 | CURRENT RULE 908 |
|---|---|---|---|
| RC-1234 | PRIORITY RANKING RULES | 2 | R-0000 |
| RC-2345 | PRICING RULES | 1 | R-1111 |
| RC-3456 | OFFER AGE RULES | 3 | R-9999 |
| RC-4567 | BUYER/SELLER REMATCH RULES | 5 | R-8888 |
| RC-5678 | GEOGRAPHY RULES | 4 | R-7777 |

| RULE CATEGORY IDENTIFIER     RC-2345 |                                                                          |
|---|---|
| RULE IDENTIFIER<br>1004 | RULE DESCRIPTION<br>1006 |
| R-1111 | MATCH ALL OTB TO HIGH OTS |
| R-2222 | MATCH HIGH OTB TO HIGH OTS<br>MATCH MEAN OTB TO MEAN OTS<br>MATCH LOW OTB TO LOW OTS |
| R-3333 | MATCH ALL OTB TO LOW OTS |
| R-4444 | MATCH HIGH AND MEAN OTB TO HIGH OTS<br>MATCH LOW OTB TO MEAN OTS |
| R-5555 | MATCH ALL OTS TO LOW OTB |

| SUBSIDY RULE IDENTIFIER 1102 | CONDITION 1104 | SUBSIDY RULE 1106 | DISCREPANCY RULE 1108 |
|---|---|---|---|
| SR-11111 | PRICE ≤ $200 | ADD UP TO $10 TO OTB | PASS EXTRA TO SELLER |
| SR-22222 | PRICE ≤ $200 | ADD UP TO $15 TO OTB | PASS EXTRA < $5.00 TO SELLER |
| SR-33333 | PRICE > $200 | ADD UP TO $30 TO OTS | CONTROLLER KEEPS EXTRA |
| SR-44444 | ALL | ADD $50 | EXTRA > $25.00 KEPT BY CONTROLLER |
| SR-55555 | ALL | ADD UP TO 20%MORE | PASS EXTRA TO SELLER |

FIG. 11

| SUBSIDY IDENTIFIER 1202 | SUBSIDY PROVIDER 1204 | SUBSIDY DESCRIPTION 1206 | CURRENT BALANCE 1208 |
|---|---|---|---|
| CS-09876 | AT&T® | $50/EACH NEW LONG DISTANCE CUSTOMER | $8,550 |
| CS-98765 | AOL® | $1/EACH CUSTOMER WHO PROMISES TO VISIT WEB SITE | 0 |
| CS-87654 | MCI® | $50/EACH NEW LONG DISTANCE CUSTOMER | $5,650 |
| CS-76543 | FIRST USA® | $30/EACH CUSTOMER TO APPLY FOR CREDIT CARD | $3,000 |
| CS-65432 | CONTROLLER | $5/EACH CUSTOMER WHO SELLS TWO ITEMS | $5,600 |

FIG. 12

| TRANSACTION IDENTIFIER 1302 | OFFER TO SELL IDENTIFIER 1304 | OFFER TO BUY IDENTIFIER 1306 | PRICE 1308 | FILL DATE 1310 | COMPLETE DATE 1312 | BUYER SUBSIDY 1314 | SELLER SUBSIDY 1316 |
|---|---|---|---|---|---|---|---|
| T-24242 | OTS-9090 | OTB-2222 | $550.00 | 10/10/00 | N/A | $0.00 | $0.00 |
| T-35353 | OTS-3333 | OTB-1111 | $100.00 | 10/14/00 | 10/17/00 | $10.00 | $0.00 |
| T-46464 | OTS-8080 | OTB-5679 | $25.00 | 10/14/00 | N/A | $0.00 | $25.00 |
| T-57575 | OTS-7654 | OTB-0812 | $65.00 | 10/15/00 | 10/20/00 | $5.00 | $5.00 |
| T-68686 | OTS-9832 | OTB-7426 | $130.00 | 10/16/00 | N/A | $0.00 | $0.00 |

… # SYSTEMS AND METHODS FOR FACILITATING A TRANSACTION BY MATCHING SELLER INFORMATION AND BUYER INFORMATION

CROSS REFERENCE TO RELATED APPLICATIONS

The present application is a divisional application of U.S. patent application Ser. No. 09/586,742 filed Jun. 5, 2000 now abandoned, which claims the benefit of U.S. Provisional Patent Application Ser. No. 60/176,158 filed Jan. 14, 2000, the entire content of which is incorporated herein by reference.

The present application is related to U.S. patent application Ser. No. 08/964,967 entitled "Conditional Purchase Offer (CPO) Management System for Collectibles" and filed Nov. 5, 1997, which is a continuation-in-part of U.S. patent application Ser. No. 08/889,319 entitled "Conditional Purchase Offer Management System" and filed Jul. 8, 1998, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers," filed on Sep. 4, 1996, and issued as U.S. Pat. No. 5,794,207 on Aug. 11, 1998; U.S. patent application Ser. No. 09/282,747 entitled "Method and Apparatus for Providing Cross-Benefits Based on a Customer Activity" and filed Mar. 31, 1999; U.S. patent application Ser. No. 09/274,281 entitled "Method and Apparatus for Providing Cross-Benefits via a Central Authority" and filed Mar. 22, 1999; and U.S. patent application Ser. No. 09/322,351 entitled "Method and Apparatus for Providing Cross Benefits and Penalties" and filed May 28, 1999; U.S. patent application Ser. No. 09/100,684 entitled "Billing Statement Customer Acquisition System" and filed May 19, 1999, which is a continuation-in-part of U.S. patent application Ser. No. 08/982,149 entitled "Method and Apparatus for Printing a Billing Statement to Provide Supplementary Product Sales" and filed on Dec. 1, 1997. The entire contents of these applications are incorporated herein by reference.

FIELD OF THE INVENTION

The present invention relates to commerce. In particular, the present invention relates to systems and methods for facilitating a transaction between a seller and a buyer.

BACKGROUND OF THE INVENTION

Many consumers are interested in selling items. A consumer may, for example, be interested in selling a used or second-hand item (i.e., a "secondary market" item) that he or she owns but no longer uses. Consumer electronics, exercise equipment, automobiles and collectibles (e.g., coins or stamps) are some examples of such secondary market items. Similarly, a consumer may be interested in selling, for example, a theater or concert ticket that he or she will not be able to use.

One way for a consumer to sell an item is through a merchant who in turn re-sells the item to another consumer. Such a merchant, however, will want to profit from the transaction, or at least pay for overhead associated with the transaction (e.g., employee salaries, rent, insurance). As a result, an item price the consumer may receive from the merchant in exchange for selling the item is generally less than an item price another consumer will be willing to provide to the merchant in exchange for the item.

Moreover, a merchant who deals with a large number of consumers may not be flexible with respect to one or more transaction terms. For example, the merchant may insist that every consumer bring his or her items directly to the merchant. A consumer may, however, prefer that a buyer pick-up an item from his or her home. For example, a consumer may prefer that a buyer pick-up a heavy and bulky piece of exercise equipment. Another consumer may prefer to meet a buyer at a mutually convenient location to complete a transaction (e.g., to maintain his or her anonymity). It will typically not be practical for a merchant to individually negotiate delivery terms, or other transaction terms, with each consumer.

Another problem with selling an item to a merchant is that a consumer may not be able to determine a reasonable price for the item. That is, a merchant will typically set the item price, and the consumer may have no way of knowing if the merchant's item price is reasonable. Although the consumer could bring the item to a number of different merchants to determine a reasonable price (e.g., by comparing item prices set by different merchants), such a solution would be inconvenient and time consuming.

In addition to selling items, many consumers are interested in purchasing items, such as secondary market items. Purchasing such items from merchants, however, may involve the same disadvantages as described above with respect to the sale of such items. Namely, a merchant may increase an item price and may not be flexible with respect to transaction terms. Moreover, a merchant typically determines an item price, and a consumer interested in purchasing the item may not be able to determine if the item price is reasonable.

As a result of these disadvantages, many consumers are interested in completing transactions directly with other consumers. Because no third party needs to make a profit, or pay for overhead, both the seller and the buyer can often benefit from such a direct "consumer-to-consumer" transaction. Moreover, both consumers can work together to decide on agreeable terms for the transaction, such as a mutually convenient delivery location.

To help facilitate consumer-to-consumer transactions, "on-line" services that communicate with a large number of sellers and buyers, such as a World Wide Web site provided via the Internet, have become increasingly popular.

In a classified advertisement, or "classifieds," type of on-line service, a seller can advertise an item to be sold at a particular price. When a buyer agrees to purchase the item at that price, the item is sold to the buyer. The advertisement may include, for example, a description of the item and an item price. A buyer can similarly advertise that he or she is interested in purchasing a particular type of item.

In an "auction" type of on-line service, a seller posts an item to be sold by auction. A post for an auction may include, for example, an item description but not an item price. A number of buyers may submit bids for that item, and the item is sold to the bidder that submits the highest bid. Such an auction type of on-line service can also let a seller set a "floor price" for the item. That is, the item will not be sold below the floor price even if no higher bids are submitted.

In addition to the classifieds and auction types of services, U.S. patent application Ser. No. 08/964,967, entitled "Conditional Purchase Offer (CPO) Management System for Collectibles," discloses a system wherein a CPO management system receives a Conditional Purchase Offer (CPO) from a buyer. The buyer's CPO is a binding offer containing one or more conditions submitted by a buyer for the purchase of an item at a buyer-defined price. The CPO management system then determines whether one or more sellers are willing to accept the buyer's CPO. If a seller accepts the buyer's CPO, and ultimately delivers an item complying with the conditions, the buyer is bound to provide payment of the buyer-defined price. The buyer's CPO may be guaranteed, for example, by a credit card account. In this way, a "race" between sellers results (i.e., the sellers compete to accept a buyer's CPO with a reasonable buyer-defined price).

With the consumer-to-consumer services described above, however, it may be difficult for a buyer and a seller to complete a transaction. For example, although a buyer may be able to determine that a seller is interested in selling a kitchen table, the buyer may not be able to determine if the seller is willing to deliver the table to a particular town. Similarly, a seller interested in selling a camera with a tripod and a particular zoom ratio may need to review information submitted by hundreds of buyers to determine which buyers are interested in purchasing a camera with these qualifications. It may be especially difficult for sellers and buyers to complete a transaction with respect to secondary market items, where the condition of an item can vary widely.

Moreover, problems exist with the ability of known consumer-to-consumer services to match buyers and sellers. For example, a seller may establish an unreasonable item price (e.g., an item price that is too high). Similarly, a buyer may submit an item price that is too low. In other cases, a buyer may be unable to pay, or a seller may be unable to accept, what he or she realizes is a reasonable item price. Such gaps between an item price a seller is willing to accept and an item price a buyer is willing to pay reduces the number of transactions completed by such services.

Another problem with known consumer-to-consumer services is that a seller may initiate, but not complete, a transaction. For example, a buyer may contact a seller who advertised that he or she was interested in selling four tickets to a particular concert only to find out that the seller had already sold the tickets to someone else. Similarly, a seller may backout of a transaction for any number of other reasons (e.g., if the seller and the buyer are unable to agree on a transaction term, such as a delivery term). In addition, buyers may also decide to not complete a transaction in many consumer-to-consumer services.

Moreover, consumer-to-consumer services typically have only a limited ability and/or flexibility to profit from a completed transaction. For example, an consumer-to-consumer service may charge a seller 5% of a sale price in exchange for facilitating a transaction. The service, however, typically does not select a particular buyer, or a particular seller, based on a resulting profit to the service. Similarly, the service typically does not select a buyer and/or seller based on other information associated with the effectiveness of the service (e.g., a total number of transactions that are completed by the service or demographic characteristics associated with the seller and/or buyer).

Note that, businesses face many of the same problems discussed above with respect to consumers. For example, a business interested in selling items to, or purchasing items from, consumers—or even a business interested in selling items to, or purchasing items from, other businesses—may find it difficult to complete a transaction.

Thus, a need exists for improved systems that facilitate transactions between buyers and sellers.

SUMMARY OF THE INVENTION

To alleviate problems inherent in the prior art, the present invention introduces systems and methods to facilitate a transaction between a seller and a buyer.

According to one embodiment of the present invention, seller offer information, associated with an item being offered for sale by a seller, is received. Buyer offer information, associated with a buyer offering to make a purchase, is also received. An evaluation rule is determined and the seller offer information and the buyer offer information are matched based on the evaluation rule. It is then arranged for the seller to sell the item to the buyer.

According to another embodiment, seller offer information, associated with an item being offered for sale by a seller, is received. An appropriate item price is determined based on the seller offer information, and information associated with the appropriate item price is transmitted to the seller. An actual seller price is then determined. Similarly, an appropriate item price may be determined based on buyer offer information, and an actual buyer item price may be determined.

According to another embodiment, seller offer information, associated with an item being offered for sale by a seller, is received. Buyer offer information, associated with a buyer offering to make a purchase, is also received. A subsidy is determined, the subsidy being associated with a benefit from a subsidy provider to be applied to the transaction. It is then arranged for the seller to provide the item to the buyer in accordance with the benefit.

According to another embodiment, a binding seller offer is received, the binding seller offer being associated with an item being offered for sale by a seller. A binding buyer offer is also received, the binding buyer offer being associated with a buyer offer to make a purchase. The binding seller offer is matched with the binding buyer offer, and it is arranged for the seller to sell the item to the buyer.

One embodiment of the present invention comprises: means for receiving seller offer information associated with an item being offered for sale by a seller; means for receiving buyer offer information associated with a buyer offering to make a purchase; means for determining an evaluation rule; means for matching the seller offer information and the buyer offer information based on the evaluation rule; and means for arranging for the seller to sell the item to the buyer.

Another embodiment comprises: means for receiving seller offer information associated with an item being offered for sale by a seller; means for determining an appropriate item price based on the seller offer information; means for transmitting information associated with the appropriate item price to the seller; and means for determining an actual seller price.

Another embodiment comprises: means for receiving seller offer information associated with an item being offered for sale by a seller; means for receiving buyer offer information associated with a buyer offering to make a purchase; means for determining a subsidy, the subsidy being associated with a benefit from a subsidy provider to be applied to the transaction; and means for arranging for the seller to provide the item to the buyer in accordance with the benefit.

Another embodiment comprises: means for receiving a binding seller offer associated with an item being offered for sale by a seller; means for receiving a binding buyer offer associated with a buyer offering to make a purchase; means for matching the binding seller offer with the binding buyer offer; and means for arranging for the seller to sell the item to the buyer.

With these and other advantages and features of the invention that will become hereinafter apparent, the nature of the invention may be more clearly understood by reference to the following detailed description of the invention, the appended claims and the several drawings attached herein.

BRIEF DESCRIPTION OF THE DRAWINGS

FIG. 3 is a tabular representation of a portion of a buyer database according to an embodiment of the present invention.

FIG. 4 is a tabular representation of a portion of a seller database according to an embodiment of the present invention.

FIG. 5 is a tabular representation of a portion of an offer to buy database according to an embodiment of the present invention.

FIG. 6 is a tabular representation of a portion of an offer to sell database according to an embodiment of the present invention.

FIG. 8 is a tabular representation of a record of a quality class database according to an embodiment of the present invention.

FIG. 9 is a tabular representation of a portion of a matching objectives database according to an embodiment of the present invention.

FIG. 10 is a tabular representation of a record of a rule database according to an embodiment of the present invention.

FIG. 11 is a tabular representation of a portion of a subsidy rules database according to an embodiment of the present invention.

FIG. 12 is a tabular representation of a portion of a subsidy database according to an embodiment of the present invention.

FIG. 13 is a tabular representation of a portion of a transaction database according to an embodiment of the present invention.

DETAILED DESCRIPTION OF THE INVENTION

The present invention is directed to systems and methods for facilitating a transaction between a seller and a buyer. According to one embodiment, a controller receives seller offer information, such as an Offer To Sell (OTS), from a seller. The seller may be, for example, an individual or business who is interested in selling an item. The item may be, by way of example, any product or service, such as a secondary market item, computer software, a ticket, a future product, a hotel room reservation, or a gift certificate. The OTS may include, for example, a seller price and information describing the item.

The controller also receives buyer offer information, such as an Offer To Buy (OTB), from a buyer. The buyer may be, for example, an individual or business who is interested in making a purchase. For example, the buyer may be interested in purchasing an item or purchasing a night to an item (e.g., renting or licensing the item). The OTB may include, for example, a buyer price and an item category (e.g., medium screen televisions or 35 mm cameras).

The controller "matches" the OTS and the OTB based on an evaluation rule (e.g., determines that the OTS satisfies the OTB and the OTB satisfies the OTS), and arranges for the seller to sell the item to the buyer. An OTB may be matched with an OTS based on, for example, the item category associated with the OTB, the information describing the item associated with the OTS, the buyer price, and the seller price. As used herein, a matching offer may be an OTS that matches an OTB or an OTB that matches an OTS.

Figure 1:
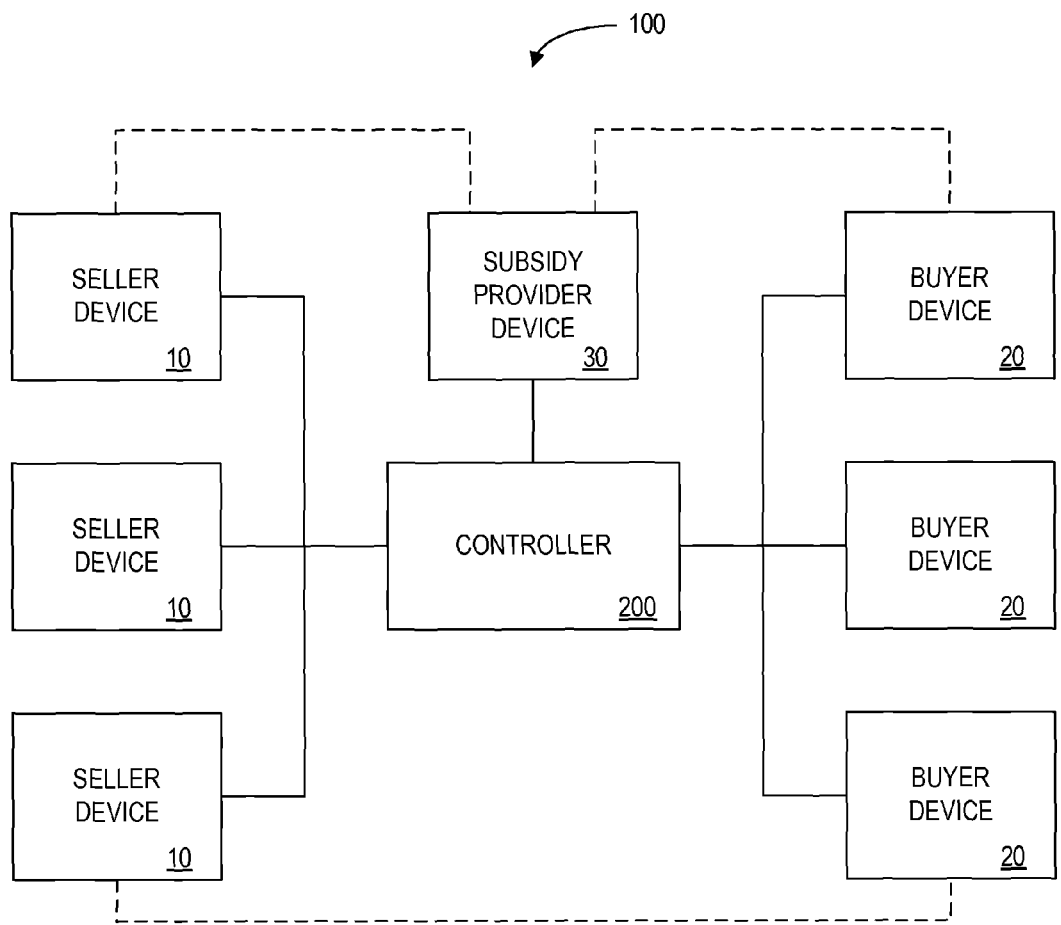
FIG. 1 is a block diagram overview of a transaction system according to an embodiment of the present invention.

Referring in detail to the drawings, FIG. 1 is a block diagram overview of a transaction system 100 according to one embodiment of the present invention. The transaction system 100 includes seller devices 10 and buyer devices 20 in communication with a controller 200. As used herein, devices (such as the seller devices 10, the buyer devices 20, the controller 200 and/or a subsidy provider device 30) may communicate, for example, via a communication network, such as a Local Area Network (LAN), a Metropolitan Area Network (MAN), a Wide Area Network (WAN), a Public Switched Telephone Network (PSTN), or an Internet Protocol (IP) network such as the Internet, an intranet or an extranet. Moreover, as used herein, communications include those enabled by wired and/or wireless technology.

Note that the seller devices 10 and the buyer devices 20 may not be in constant communication with the controller 200. For example, a seller device 10 may only communicate with the controller 200 when a seller accesses a Web site associated with the controller 200. Although embodiments of the present invention are described with respect to information exchanged via a Web site, according to other embodiments information can instead be exchanged via, for example: a telephone, an Interactive Voice Response Unit (IVRU), a facsimile machine, regular mail, electronic mail, a WFBTV® interface, an Automated Teller Machine (ATM), a cable network interface, or a wireless communication system.

In general, the controller 200 and the subsidy provider device 30 can be any device capable of performing methods in accordance with the present invention. For example, the controller 200 may be a Web server. The seller device 10 and/or the buyer device 20 may be, for example: a Personal Computer (PC), a portable computing device such as a Personal Digital Assistant (PDA), a wired or wireless telephone, a one-way or two-way pager, a kiosk, an ATM, a smart card, a magnetic stripe card, or any other appropriate communication or storage device.

Note that the seller devices 10 and/or the buyer devices 20 may include a number of different types of devices (e.g., some buyers may use PCs while others use telephones). Also note that any of the seller devices 10, the buyer devices 20, the subsidy provider device 30 and/or the controller 200 may be incorporated in a single device (e.g., a kiosk may serve as a seller device 10, a buyer device 20 and a controller 200).

According to an embodiment of the present invention, the controller 200 may receive an offer, including offer information, a seller device 10 or a buyer device 20. As used herein, an "offer" may mean either an OTB or an OTS and is not limited to the legal definition of an offer (i.e., an offer may include a communication that will not result in a binding contract when accepted). The controller 200 generates a matching code for the offer based on the offer information. Typically, the offer information associated with an OTB is "broad" (e.g., only an item category is provided) and the offer information associated with an OTS is "specific" (e.g., a seller describes in detail a particular item he or she is interested in selling). The matching code is used by the controller 200 to find a matching offer.

According to one embodiment, the controller 200 stores indications of "quality classes" which indicate various levels of item quality. For example, the controller 200 may use the offer information to assign a quality score (e.g., a score indicating that the item has four out of five desirable features) and, based on the quality score, assign the offer to a particular quality class. The quality class may, for example, enable the controller 200 to find a matching offer with a comparable quality.

Determining a quality class also enables the controller 200 to determine and suggest an appropriate item price (e.g., $50) or item price range (e.g., $45 to $55) for an offer. For example, the controller 200 may retrieve an appropriate item price range associated with a quality class and transmit an indication of the appropriate item price range to the buyer or seller associated with the offer. The buyer or seller may select an appropriate item price or item price range, or enter his or her own item price.

According to one embodiment, the controller 200 matches an OTS and an OTB by searching for matching offer codes. The search may be performed, for example, when a new OTS is received, when a new OTB is received, and/or on a periodic (e.g., every hour) or non-periodic basis. The controller 200 may then, according to one embodiment, retrieve the item price associated with each potentially matching offer. When searching for a match for an OTS, the controller 200 may eliminate a potentially matching OTB if an item price associated with the OTB (e.g., a maximum buyer price) is lower than an item price associated with the OTS (e.g., a minimum seller price). Similarly, when searching for a match for an OTB, the controller 200 may eliminate a potentially matching OTS if an item price associated with the OTS is higher than an item buyer price associated with the OTB.

If the controller 200 determines that a matching offer cannot be found, the controller 200 may, according to one embodiment, calculate a subsidy amount that would need to be added to (or subtracted from) an offer price in order to find at least one matching offer. For example, consider an OTS associated with a seller price of $100. The controller 200 may determine that a first OTB associated with a buyer price of $50 and a second OTB associated with a buyer price of $80 potentially match the OTS (e.g., each OTB is associated with an item category that matches the item associated with the OTS). In this case, the controller 200 may determine that a subsidy of $20 (i.e., $100-$80) would enable the second OTB to match the OTS. Note that the $20 may either be added to the OTB or subtracted from the OTS. When the subsidy is provided by a third party (e.g., a party other than the controller 200, the buyer and/or the seller), the controller 200 may communicate with the subsidy provider device 30 to determine if the subsidy may be offered to the buyer or the seller (e.g., in exchange for the buyer and/or the seller performing a task).

According to an embodiment of the present invention, if more than one matching offer exists based on matching codes and item prices, the controller 200 retrieves a matching objective in order to select a matching offer. The matching objective may be, for example, any rule or set of rules the controller 200 can use to select a matching offer. For example, different matching objectives may be arranged into a hierarchy and applied (e.g., to eliminate potentially matching offers) until a single matching offer remains. The hierarchy may be adjusted, for example, manually by an operator of the controller 200 or automatically based on historical, current or predicted data. Once a single matching offer is found, the controller 200 may, according to an embodiment of the present invention, automatically "bind" the offers (i.e., associate the seller's OTS with the buyer's OTB) and notify the seller and buyer of the completed match. According to one embodiment of the present invention, the controller 200 also arranges for the seller to sell the item to the buyer.

Note that a seller device 10 and/or a buyer device 20 may also communicate directly with the subsidy provider device 30 (as shown by a dashed line in FIG. 1). For example, a subsidy provider may offer to contribute an amount that will enable an OTS to match with an OTB if both the seller and the buyer apply for a new credit card. In this case, the credit card application information (e.g., the customer's name, address and Social Security number) may be transmitted directly from the seller device 10 and the buyer device 20 to the subsidy provider device 30. Similarly, information about available subsidy offers may be transmitted directly from the subsidy provider device 30 to one or more seller devices 10 and/or buyer devices 20.

Note that although a single subsidy provider device 30 is shown in FIG. 1, any number of subsidy provider devices 30 may be included in the transaction system 100. Similarly, any number of the other devices described herein may be included according to embodiments of the present invention (e.g., a number of controllers may operate together).

Transaction Examples

Several transaction examples will now be described to illustrate how the transaction system 100 may be used according to various embodiments of the present invention. Although some examples are described with respect to an OTB submitted by a buyer, it will be understood by those skilled in the art that similar examples may involve an OTS submitted by a seller.

Consider a buyer who is interested in purchasing an item. The controller 200 may receive buyer offer information, such as buyer registration information (e.g., submitted when the buyer registered to use the controller 200) and/or an OTB, from a buyer device 20. The buyer offer information may be used, for example, to generate a matching code for the OTB.

The controller 200 may receive the buyer offer information, for example, after leading the buyer through a series of questions (e.g., pull-down menus displayed via a Web site) to define an item category (e.g., exercise equipment), a condition of the item (e.g., mint, good, or fair), and the age of the item.

The controller 200 may also prompt the buyer to enter a general description of the item he or she is interested in purchasing. For example, the buyer may supply a brand name, a manufacturer, and model number of a particular item her or she is interested in purchasing (or of a representative item). In this case, the controller 200 may categorize the description for the buyer.

The controller 200 may also determine a quality class associated with the buyer offer information. For example, the buyer may select an item category, and the controller 200 may retrieve and display quality classes associated with that category. A quality class display may include, for example, a brief description and an exemplary set of the manufacturers and models numbers within the class. A quality class may also be associated with an appropriate range of item prices.

The buyer may then select a quality class based on his or her budget and expectations. According to an embodiment of the present invention, by selecting a quality class the buyer agrees to accept any item that falls within the quality class. The controller 200 may have predetermined matching codes associated with each quality class.

In general, the buyer offer information will be broad, such as an item category or a general description of the desired item, including information (such as acceptable brands and features) that will help the controller 200 determine a quality class. For example, the buyer offer information may include one or more product features or accessories that must be included with the item.

The buyer offer information may also indicate acceptable item price and feature trade-offs, mandatory item requirements, and transaction preferences. For example, a buyer may be willing to accept any video camera but prefers to receive a Video Home System-Compact (VHS-C) video camera if one is available. Similarly, a buyer may insist on purchasing an item from a student or a charity.

In another example, the controller 200 may ask a buyer "Would you accept a television without surround sound for $25 less than your offer price?" or "Would you accept surround sound in place of picture-in-picture capability?" The controller 200 may use answers to these questions to locate a matching OTS. The controller 200 may also, according to one embodiment, submit a counter-offer to the buyer if no OTS exactly matches one or more features included in the OTB.

Such buyer offer information may be a valuable demand collection tool and help a manufacturer determine a perceived value of a feature. For example, if a buyer agrees to increase a buyer price by $5 in exchange for a feature, the feature is worth about $5 to that buyer. Similarly, if most buyers will not accept a television with a remote control in exchange for an upgrade to a higher quality class, but will accept a television without picture-in-picture capability for such an upgrade, it can be assumed that buyers consider a remote control more valuable than picture-in-picture capability.

According to one embodiment, a buyer may rank a number of features associated with an OTB. For example, a buyer may indicate that one feature is "necessary" (i.e., a matching offer must have the feature) and another is "desired." The controller 200 may use these rankings to match offers, as well as to collect demand information.

With respect to an OTS, the seller offer information will typically be more specific. For example, the seller offer information may indicate the manufacturer, model number, condition, year, and color of an item. That is, the seller is describing a particular item that is being offered for sale. For example, the seller offer information may indicate that the seller is interested in selling a "1993 SONY® WALKMAN®, working condition."

In addition to information about a type of item or a particular item, offer information (i.e., buyer offer information or seller offer information) may include information about buyer or seller. For example, offer information may include a name, an address, contact information (e.g., an electronic mail address or telephone number) and/or demographic information. The offer information may also include a payment identifier (e.g., a credit card number) that may be used by the controller 200 to collect transaction fees from buyers and/or sellers. The payment identifier may also be used to credit or debit an account as appropriate to complete a transaction (e.g., an amount based on an item price). According to one embodiment, such payments may be made over time in installments.

The offer information may also include an offer price. That is, an OTS may include a seller price. The seller price may represent, for example, a seller asking price (e.g., an amount the seller would like to receive) and/or a seller minimum price (e.g., an amount below which the seller would not sell an item). Similarly, an OTB may include a buyer price (e.g., a buyer asking price and/or a buyer maximum price).

The offer information may also include a time limit, such as an offer period or expiration date. Such a time limit may be used, for example, by the controller 200 to reduce the chance that an OTS or an OTB will remain unmatched for an unreasonable amount of time (e.g., when more than one potentially matching OTB is determined, the controller 200 may select the OTB with the nearest expiration date). According to other embodiments, the controller 200 may determine a time limit or notify the seller or buyer when an offer can be removed. The controller 200 may also use such a time limit to anticipate supply and/or demand and more accurately manage an offer "pipeline." For example, the controller 200 may wait to match an OTB until after a holiday when fewer offers will be received. In exchange, the buyer may receive an extended warranty period, a higher quality item or a subsidy from the controller 200.

The offer information may also include delivery information, such as a shipping preference. For example, a buyer may choose to pick-up an item at a specific place or have the item shipped to his or her home. In one embodiment the controller 200 displays a map, which a buyer (or seller) can use to specify how far he or she is willing to travel to pick-up (or deliver) an item.

During a transaction, the controller 200 may provide a subsidy offer to a buyer (and/or a seller). For example, a subsidy offer may be provided to a buyer when he or she initially registers with the controller 200, when the buyer submits an OTB, when no potentially matching OTS is located, or prior to an expiration date associated with the OTB. For example, the buyer may receive a message stating "Sign up for AT&T® long distance service, and we'll advance you in our matching queue—you'll get a better product in less time!" Several types of subsidy offers are described in U.S. patent application Ser. No. 09/274,281 entitled "Method and Apparatus for Providing Cross-Benefits via a Central Authority." The buyer's response to the subsidy offer (e.g., an acceptance) may be received and stored by the controller 200.

According to one embodiment, a reward, such as payment of an award amount or is the availability of a subsidy offer, may be provided to a party based on the corresponding demand for his or her offer. For example, consider a seller who submits an OTS for an item. If a large number of offers to buy are currently pending (or have historically been submitted) for that type of item (and/or at the seller's price), a reward may be provided to the seller. Similarly, a reward may be provided to a buyer who submits a popular OTB. The reward may be predetermined or may be based on, for example: supply information, demand information, the item category, and/or the item price.

According to another embodiment, the controller 200 may notify the buyer of an incentive available in exchange for receiving information about newly introduced items (e.g., information about a new computer model when the buyer is offering to purchase a computer), or a willingness to purchase a substitute item or a supplemental item (e.g. a toner cartridge or a toner cartridge subscription when the buyer is offering to purchase a printer).

According to one embodiment, a seller's OTS and/or a buyer's OTB may be "binding." That is, a penalty may be applied if the seller and/or the buyer do not complete a transaction. For example, the controller 200 may notify a buyer of a penalty (e.g., a predetermined or variable penalty amount). A penalty may be applied, for example, if the buyer fails to pick-up an item. The controller 200 may similarly notify a seller of a penalty imposed, for example, if he or she misrepresents the quality of an item sold to a buyer.

According to one embodiment, an offer may be assigned a priority ranking. For example, when more than one OTB is determined to be a potentially matching offer, an OTB having the highest priority ranking may be selected by the controller 200. Thus, a higher priority ranking for an offer may, for example, enable an OTB to be matched more quickly or with a more favorable OTS (e.g. an OTS associated with a lower price and/or a higher quality class).

A priority ranking may be determined, for example, initially when a buyer submits an OTB. The priority ranking may also change dynamically before the OTB is matched. According to one embodiment, the controller 200 may allow a buyer to pay for an improved priority ranking (either on an offer-by-offer basis or with respect to all of the parties offers). For example, a buyer may receive a message asking "Will you pay $2.00 to be given high priority in our matching system?"

According to another embodiment, the priority ranking is based on a measured desirability of the particular type of item associated with the OTB. For example, if a large number of sellers have offered, or are currently offering, to sell the same type of item, the controller 200 may assign the a high priority ranking to the OTB (e.g., because there is a large supply of that type of item). Similarly, if a large number of buyers have been interested, or are currently interested, in purchasing the same type of item, the controller 200 may assign the a low priority ranking to the OTB (e.g., because there is a large demand for that type of item).

A priority ranking may also be based on how long an offer has remained unmatched and/or how close an offer is to an expiration date. For example, as a buyer's OTB remains unmatched the controller 200 may increase a priority ranking to expedite matching. A priority ranking may also be based on delivery information. For example, a buyer may receive a high priority ranking if he or she is more flexible about where and when an item may be delivered. A priority ranking may also be based on past transactions between a buyer and the controller 200. For example, the controller 200 may store "reputation" information based on problems that have occurred in the past (e.g., failing to deliver an item or provide a payment at an appropriate time). A priority ranking for a newly registered buyer may start out high to encourage the buyer to use the transaction system 100 in the future.

A priority ranking may also be based on whether the buyer has accepted a subsidy offer. That is, a buyer who accepts a subsidy offer may receive a higher priority ranking because of his or her acceptance. A priority ranking may also be based on whether the buyer has submitted an appropriate buyer price with the OTB (e.g., whether the buyer price is within an appropriate item price range suggested by the controller 200).

The buyer information may include a quality class of the item he or she is interested in purchasing. For example, the buyer may indicate that he or she is interested in a purchasing a stereo having a quality class of "better." According to another embodiment, the controller 200 may determine a quality class based on the buyer offer information (e.g., based on the particular features the stereo must have). According to another embodiment, a quality class may be predicted based on the buyer's past history with the transaction system 100.

The quality classes may be organized based on, for example, a number of features, item manufacturers, an item condition, and/or accessories associated with an item. For example, the highest quality class may have the most features, the most exclusive manufacturers, at least a good item condition, and the most accessories. In contrast, the lowest quality class may have the fewest features, the most number of acceptable manufacturers, a lower item condition, and fewer accessories.

The quality classes may be altered periodically based on current data (e.g., a previously desirable feature becomes obsolete and an item with such a feature is moved to a lower quality class). For example, when an OTB is received, the controller 200 may assign a "score" to the OTB based on the item description provided by the buyer. The buyer may submit, for example, an item category, a minimum acceptable condition, one or more acceptable brands, and desired features and accessories. Based on the description, the controller 200 can score the OTB and, based on the score, determine an appropriate quality class.

Note that an OTB may fall into more than one quality class. For example, an OTB may be assigned to both a "better" and a "best" class. That is, the best class may simply be a subset of the better class.

According to an embodiment of the present invention, the controller 200 retrieves an appropriate item price range associated with a quality class and outputs the range to the buyer device 20. The appropriate item price range may, for example, help a buyer select a buyer price to include in his or her OTB. The appropriate item price range may be determined based on, for example, historical, current or predicted data and may be adjusted by the controller 200 when appropriate. According to one embodiment, the buyer is free to determine any buyer price (e.g., including a buyer price outside of the range suggested by the controller 200). In another embodiment, the buyer price must be within the appropriate item price range. Note that an appropriate item price range for a quality class may be different for an OTB and an OTS.

For example, consider a buyer who is interested in purchasing a television. The controller 200 displays a list of television features and brands to the buyer. The buyer selects "color," "remote control," and "picture-in-picture capability" as desired features and indicates that he or she is willing to accept televisions made by "all manufacturers." The controller 200 determines that the buyer's selected features are associated with both a "good" and a "better" quality class, but not a "best" quality class (which has a more limited selection of manufacturers). The controller 200 assigns the OTB to the "better" quality class and displays an appropriate item price range of $150-$250 to the buyer. The buyer may either select a buyer price within the appropriate item price range, or name a different price.

Based on the compatibility of offer codes and offer price, the controller 200 attempts to retrieve and match at least one matching OTS to the OTB. For example, the controller 200 may search for all matching OTS codes compatible with the OTB matching code (e.g., a potentially matching OTS has at least the features described by the OTB). That is, an OTS that matches the OTB item category (e.g., "television") but does not match the required features (e.g., "at least a 27 inch screen") or quality class (e.g., "better") of the OTB is eliminated from the search.

The controller 200 also eliminates an OTS if the seller price exceeds the buyer price associated with the OTB. If the OTB is associated with both an asking price and a maximum price, the controller 200 may decide to base the search on either price. This decision may be based on, for example, whether the controller 200 is interesting in improving a benefit associated the buyer (i.e., by matching his or her asking price), or whether the controller 200 is interested in completing transactions (i.e., by matching the buyer's maximum price).

If the controller 200 does not find a matching OTS, the OTB may be stored in a database and the controller 200 may attempt to find a match for the OTB again later. According to another embodiment, the OTB is simply rejected if the controller 200 does not initially find a matching OTS.

According to one embodiment, if a single matching OTS is found, the controller 200 automatically binds the OTB and the matching OTS. According to another embodiment, the controller 200 may not automatically bind an OTB with an OTS when a single potentially matching OTS is found (e.g., the controller may wait two days to determine if another potentially matching OTS is submitted).

Consider, for example, a buyer who submits an OTB for a television with an asking price of $100 and a maximum price $125. The controller 200 receives the OTB, generates a matching code, assigns it to a "better" quality class, and searches for an OTS with a similar (or identical) matching code. The controller 200 also eliminates an OTS if it has a minimum price higher than $100. If a single matching OTS remains after this elimination, the controller 200 automatically binds that OTS and the OTB and completes the transaction. If no matching OTS remains, the controller 200 searches for an OTS with a similar (or identical) matching code and a minimum price less than $125. If one such OTS is found, the controller 200 automatically binds the matching OTS and the OTB. If there is more than one matching OTS, the controller 200 may use matching objectives to select an OTS as described herein.

According to one embodiment of the present invention, the controller 200 calculates and adds a subsidy amount to an OTB and/or an OTS in order to find a matching offer. For example, the controller 200 may fund a special account or budget to subsidize offers and increase the number of successful matches. The controller 200 may set a maximum amount to subsidize each offer, or use subsidy rules to determine an amount. The controller 200 may, for example, add the subsidy amount to the OTB and search for a matching OTS.

If a matching OTS is found, the controller 200 determines if there is a discrepancy between the seller price and the buyer price adjusted by the subsidy amount. In other words, the controller 200 calculates [(buyer price+subsidy amount)−seller price], which represents a surplus amount of money. The surplus may be, for example, kept by the controller 200 (e.g., as profit or to be used with respect to another OTS or OTB) or passed onto the seller and/or buyer.

In another embodiment, the controller 200 may find the closest matching offer and determine a subsidy amount needed to complete that match. If it is equal to or less than a predetermined amount (or percentage), the controller 200 may automatically add the subsidy to the offer and complete the match.

Consider, for example, a controller 200 that receives an OTB including a buyer price of $100. Although at least one OTS matches based on the matching code, no OTS has a seller price of $100 or less. The controller 200 retrieves subsidy rules and determines that the OTB can be subsidized for up to 20% of the buyer price. The controller 200 adds $20 to the buyer price and again attempts to find a matching OTS. The controller 200 now finds a matching OTS with a seller price of $115. The controller 200 automatically binds both the OTB and the matching OTS, and determines that the extra money (i.e. $5) is passed on to the seller.

In one embodiment, the controller 200 receives an OTB or OTS and calculates and presents an offer to finance the transaction. Offering to finance a purchase in this way may enable the controller 200 to complete more transactions, as well as earn a profit on the interest earned by the finance offer. One or more subsidies may also be calculated and included in the finance offer.

According to one embodiment of the present invention, the controller 200 uses one or more matching objectives to select a single offer from a group of potentially matching offers. The matching objectives may represent, for example, one or more goals of the controller 200. The matching objectives may be a hierarchy of rules that are applied until a single matching offer remains. According to one embodiment, the matching objectives are predetermined and/or are periodically re-organized (e.g., automatically by the controller 200 or manually by an operator) depending on objectives of the controller 200 (e.g., increasing a profit or increasing a number of completed transactions).

In one embodiment, the controller 200 changes the hierarchy of the rules after a predetermined number of transactions have taken place (e.g. after accumulating a statistically significant sample pool) and determines which matches are more beneficial (e.g., increase profit, reduce customer service complaints, or increase the number of completed transactions). Note that the matching objectives may be the same, or may be different, with respect to an OTB and an OTS.

A matching objectives rule may be based on, for example, priority rankings associated with a buyer and/or a seller. For example, an offer with higher priority ranking may match more quickly, or more beneficially, than an offer with a lower priority ranking. In this case, if an OTB is received with a high buyer price, an OTS with a higher priority ranking may be selected by the controller 200.

A matching objectives rule may also be based on an item price. For example, the controller 200 may periodically determine which price among several is "optimal" for matching. That is, if there are four matching offers with four different prices, the controller 200 may decide that the highest priced one should be filled first. The controller 200 may adjust such a pricing rule (e.g., automatically or manually) when appropriate.

A matching objectives rule may also be based on whether the buyer and seller have previously completed a transaction with each other. If so, the controller 200 may determine if the previous transaction was successful. If the transaction was not successful (e.g., the buyer had submitted a complaint about the seller), the controller 200 may eliminate the associated offer.

A matching objectives rule may also be based on how long a matching offer has remained unmatched. For example, the controller 200 may select an older offer, a newer offer, an offer that is closest to an expiration date, or an offer that is farthest away from an expiration date.

A matching objectives rule may also be based on the location of the buyer and/or seller. For example, the controller 200 may select the potentially matching offer associated with a buyer who lives in the same town as the seller. Similarly, other information about the buyer and the seller may be used when determining a matching OTB and OTS (e.g., the age of the buyer and/or the seller).

A matching objectives rule may also be based on the identity of the seller and/or the buyer. For example, the controller 200 may "own" certain items and store them in a warehouse. In this case, warehouse items may be matched more quickly. Alternatively, warehouse items may be matched less quickly (e.g., to increase seller satisfaction).

A matching objectives rule may also be based on whether the item is a manufacturer-promoted item. For example, a manufacturer may pay the controller 200 a fee to match a particular brand or model number first.

Once the matching objectives are retrieved, the controller 200 applies them to each potential matching OTS (e.g., each OTS having a "pending" status) until a single matching OTS remains. The eliminated offers are assigned an "unmatched" status, and the selected OTS and the OTB are assigned a "matched" status.

The appropriate seller and the buyer are notified, and the transaction is completed. According to one embodiment, the controller 200 charges the buyer and/or seller a commission fee (e.g., a predetermined amount or a percentage of the item price) either before or after the transaction is complete. The controller 200 may also arrange for the seller to sell the item to the buyer. For example, the controller 200 may debit an account associated with the buyer and credit an account associated with the seller. The controller 200 may also, according to one embodiment of the present invention, arrange for the delivery of the item (e.g., sending a delivery service to the seller) and/or arrange to inspect the item (e.g., by receiving the item from the seller, inspecting the item and delivering the item to the buyer).

Controller

Figure 2:
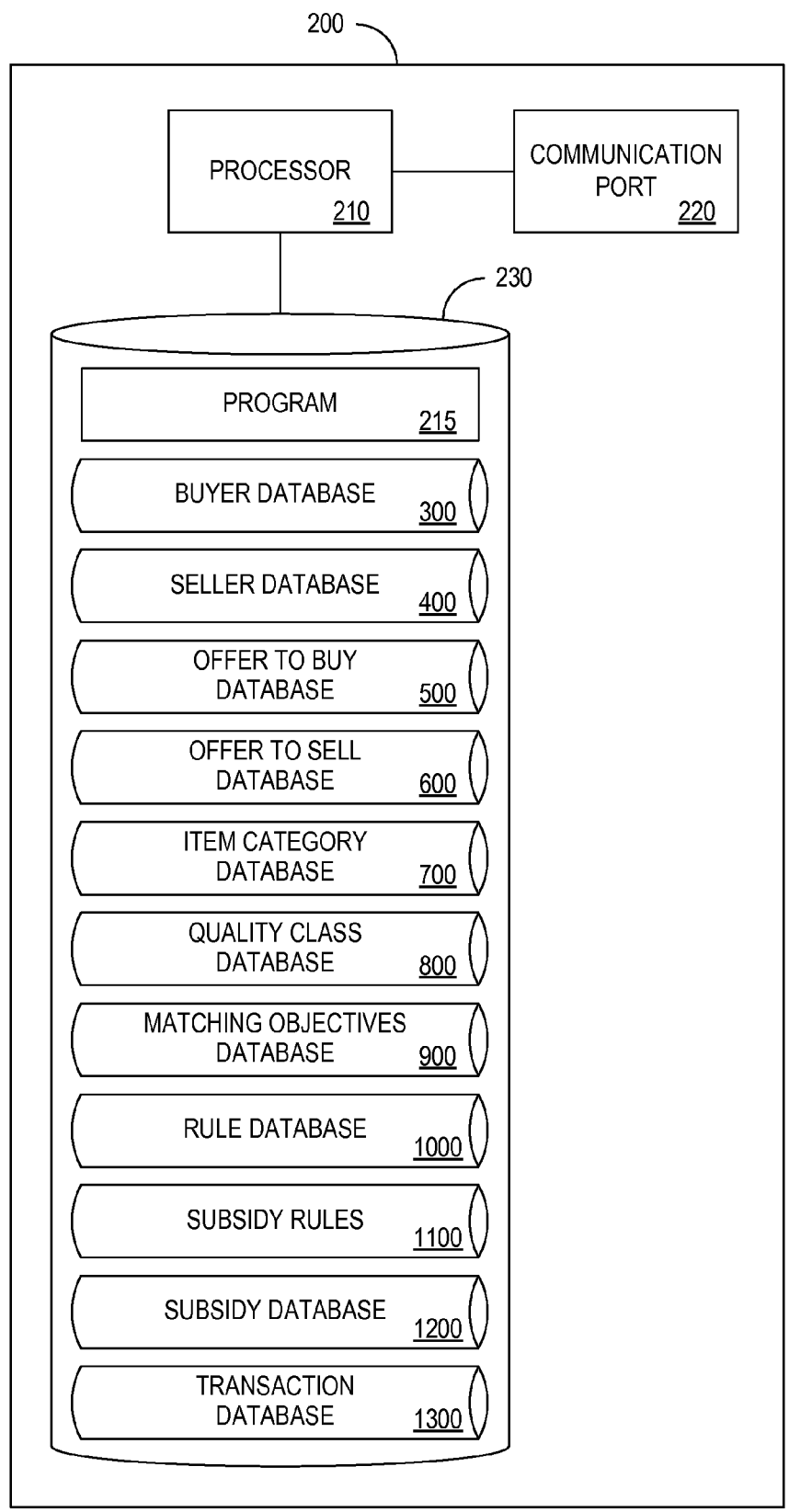
FIG. 2 is a block diagram of a controller according to an embodiment of the present invention.

FIG. 2 illustrates a controller 200 that is descriptive of the device shown in FIG. 1 according to an embodiment of the present invention. The controller 200 comprises a processor 210, such as one or more INTEL® Pentium® processors, in communication with a communication device 220 configured to communicate through a communication network (not shown in FIG. 2). The communication device 220 may be used to communicate, for example, with: one or more seller devices 10, one or more buyer devices 20 and/or one or more subsidy provider devices 30.

The processor 210 is also in communication with a storage device 230. The storage device 230 may comprise any appropriate information storage device, including combinations of magnetic storage devices (e.g., magnetic tape and hard disk drives), optical storage devices and semiconductor memory devices, such as Random Access Memory (RAM) devices and Read Only Memory (ROM) devices.

The storage device 230 stores a program 215 for controlling the processor 210. The processor 210 performs instructions of the program 215, and thereby operates in accordance with the present invention. For example, the processor 210 may receive seller offer information associated with an item being offered for sale by a seller, receive buyer offer information associated with a buyer offering to make a purchase, determine an evaluation rule, match the seller offer information and the buyer offer information based on the evaluation rule, and arrange for the seller to sell the item to the buyer.

According to another embodiment, the processor 210 may receive seller offer information associated with an item being offered for sale by a seller, determine an appropriate item price based on the seller offer information, transmit information associated with the appropriate item price to the seller, and determine a seller price. Similarly, the processor 210 may receive buyer offer information associated with a buyer offering to make a purchase, determine an appropriate item price based on the buyer offer information, transmit information associated with the appropriate item price to the buyer, and determine a buyer price.

According to another embodiment, the processor 210 may receive seller offer information associated with an item being offered for sale by a seller, receive buyer offer information associated with a buyer offering to make a purchase, determine a subsidy, the subsidy being associated with a benefit from a subsidy provider to be applied to the transaction, and arrange for the seller to provide the item to the buyer in accordance with the benefit.

The program 215 may be stored in a compressed, uncompiled or encrypted format. The program 215 may furthermore include program elements that may be necessary, such as an operating system, a database management system and "device drivers" used by the processor 210 to interface with peripheral devices. Appropriate program elements are known to those skilled in the art.

Note that the processor 210 and the storage device 230 may be, for example: (i) located entirely within a single computer or other computing device or (ii) located in separate devices coupled through a communication channel. In one embodiment, the controller 200 comprises one or more computers that are connected to a remote database server.

As used herein, information may be "received" by, for example: (i) the controller 200 from any other device or (ii) a software application or module within the controller 200 from another software application, module or any other source. Similarly, information may be "transmitted" to, for example: (i) another device from the controller 200 or (ii) a software application or module within the controller 200 from another software application, module or any other source.

As shown in FIG. 2, the storage device 230 also stores: a buyer database 300 (described with respect to FIG. 3); a seller database 400 (described with respect to FIG. 4); an offer to buy database 500 (described with respect to FIG. 5); an offer to sell database 600 (described with respect to FIG. 6); an item category database 700 (described with respect to FIG. 7); a quality class database 800 (described with respect to FIG. 8); a matching objectives database 900 (described with respect to FIG. 9); a rule database 1000 (described with respect to FIG. 10); a subsidy rules database 1100 (described with respect to FIG. 11); a subsidy database 1200 (described with respect to FIG. 12); and a transaction database 1300 (described with respect to FIG. 13).

Examples of databases that may be used in connection with the transaction system 100 will now be described in detail with respect to FIGS. 3 through 13. Each figure depicts a database in which the data is organized according to a data structure in accordance with embodiments of the present invention. The data may be stored, for example, on a computer readable medium and be accessible by a program executed on a data processing system. The schematic illustration and accompanying description of these databases are exemplary, and any number of other database arrangements could be employed besides those suggested by the figures.

Buyer Database

Referring to FIG. 3, a table represents one embodiment of the buyer database 300 that may be stored at the controller 200 according to an embodiment of the present invention. The table includes entries identifying buyers who may offer to make a purchase. The table also defines fields 302, 304, 306, 308, 310, 312, 314, 316, 318 for each of the entries. The fields specify: a buyer identifier 302; a buyer name 304; an address 306; a contact identifier 308; associated offers to buy 310; a priority ranking 312; a payment identifier 314; accepted subsidy offers 316; and a current balance 318. The information in the buyer database 300 may be created and updated, for example, when a buyer registers with the controller 200.

The buyer identifier 302 may be, for example, an alphanumeric code associated with a buyer who may offer to make a purchase via the transaction system 100. The buyer identifier 302 may be, for example, generated by the controller 200 or the buyer (e.g., when the buyer selects a user name and password).

For each buyer, the buyer database 300 may also store the buyer name 304 and the address 306 associated with the buyer. This information may be based on, for example, information provided by the buyer when he or she registers with the controller 200.

For each buyer, the buyer database 300 may also store the contact identifier 308 that the controller 200 may use to contact the buyer (e.g., to inform the buyer that an OTB has been matched). The contact identifier 308 may be, for example, an electronic mail address or a telephone number and may be based on, for example, information provided by the buyer when he or she registers with the controller 200 or submits an OTB.

The buyer database 300 may also store an indication (e.g., an identifier) of the associated offers to buy 310 that have been submitted by the buyer as well as the priority ranking 312 associated with the buyer. For example, as illustrated by the first entry of FIG. 3, the buyer having a buyer identifier of "B-11111" has submitted two offers to buy (i.e., "OTB-0000" and "OTB-3333") and has a priority ranking 312 of "1."

The payment identifier 314 stored in the buyer database 300 may be used by the controller 200, for example, to arrange for the buyer to pay for an item, to charge the buyer a fee in exchange for facilitating a transaction, and/or to apply a penalty to the buyer.

The accepted subsidy offers 316 may store an indication (e.g., an identifier) associated with each subsidy offer that the buyer has accepted. Each of the accepted subsidy offers 316 may be associated with, for example, a subsidy amount to be used in connection with an OTB in exchange for the performance of a task by the buyer (e.g., in exchange for answering five question or subscribing to a magazine). According to another embodiment, an accepted subsidy offer may be associated with a specific OTB (instead of with a buyer).

The current balance 318 may indicate, for example, fees, item prices and/or penalty amounts that the buyer owes to the controller 200 and/or to one or more sellers.

Seller Database

Referring to FIG. 4, a table represents one embodiment of the seller database 400 that may be stored at the controller 200 according to an embodiment of the present invention. The table includes entries identifying sellers who may offer to sell an item. The table also defines fields 402, 404, 406, 408, 410, 412, 414, 416, 418 for each of the entries. The fields specify: a seller identifier 402; a seller name 404; an address 406; a contact identifier 408; associated offers to sell 410; a priority ranking 412; a payment identifier 414; accepted subsidy offers 416; and a current balance 418. The information in the seller database 400 may be created and updated, for example, when a seller registers with the controller 200.

The seller identifier 402 may be, for example, an alphanumeric code associated with a seller who may be interested in selling an item via the transaction system 100. The seller identifier 402 may be, for example, generated by the controller 200 or the seller (e.g., when the seller selects a user name and password).

For each seller, the seller database 400 may also store the seller name 404 and the address 406 associated with the seller. This information may be based on, for example, information provided by the seller when he or she registers with the controller 200.

For each seller, the seller database 400 may also store the contact identifier 408 that the controller 200 may use to contact the seller (e.g., to inform the seller that an OTS has been matched). The contact identifier 408 may be, for example, an electronic mail address or a telephone number and may be based on, for example, information provided by the seller when he or she registers with the controller 200 or submits an OTS.

The seller database 400 may also store an indication (e.g., an identifier) of the associated offers to sell 410 that have been submitted by the seller as well as the priority ranking 12 associated with the seller. For example, as illustrated by the first entry of FIG. 4, the seller having a seller identifier of "S-1111" has submitted two offers to sell (i.e., "OTS-5555" and "OTS-3333") and has a priority ranking 412 of "1."

The payment identifier 414 stored in the seller database 400 may be used by the controller 200, for example, to arrange for the seller to receive payment for an item, to charge the seller a fee in exchange for facilitating a transaction, and/or to apply a penalty to the seller.

The accepted subsidy offers 416 may store an indication (e.g., an identifier) associated with the subsidy offers that the seller has accepted. Each of the accepted subsidy offers 416 may be associated with, for example, a subsidy amount to be used in connection with an OTS in exchange for the performance of a task by the seller. According to another embodiment, an accepted subsidy offer may be associated with a specific OTS.

The current balance 418 may indicate, for example, fees, item prices and/or penalty amounts that the seller owes to the controller 200 and/or to one or more buyers.

Note that the buyer database 300 and the seller database 400 may comprise a single database. In this case, the database may store both OTS and OTB information regarding each person.

Offer to Buy Database

Referring to FIG. 5, a table represents one embodiment of the offer to buy database 500 that may be stored at the controller 200 according to an embodiment of the present invention. The table includes entries each identifying an offer to purchase an item. The table also defines fields 502, 504, 506, 508, 510, 512, 514, 516 for each of the entries. The fields specify: an offer to buy identifier 502; a date received 504; an item category 506; a matching code 508; a quality class 510; an asking price 512; a maximum price 514; and a status 516. The information in the offer to buy database 500 may be created and updated, for example, when an OTB is received from a buyer.

The offer to buy identifier 502 may be, for example, an alphanumeric code associated with a buyer's offer to purchase an item. The offer to buy identifier 502 may be, for example, generated by the controller when a buyer submits an OTB and may be based on the associated offers to buy 310 stored in the buyer database 300. The date received may indicate the date (and time of day) that the OTB was received by the controller 200.

The item category 506 may be, for example, an alphanumeric code and may indicate the type of item the buyer is interested in purchasing. The item category 506 may be, for example, selected by the buyer or be determined by the controller 200 based on information received from the buyer.

The matching code 508 may be, for example, an alphanumeric code and may indicate in detail the type of item the buyer is interested in purchasing (e.g., including an age of the item, one or more features associated with the item and acceptable product manufacturers). The matching code 508 may be, for example, determined by the controller 200 based on information received from the buyer. The quality class 510 may be, for example, an alphanumeric code and may indicate a level of quality associated with the item the buyer is interested in purchasing. The quality class 510 may be, for example, selected by the buyer. The quality class 510 may instead be determined by the controller 200 based on information received from the buyer (e.g., based on the item category 506, the matching code 508, the asking price 512, and/or the maximum price 514).

The asking price 512 and the maximum price 514 may represent an amount the buyer would like to pay and the highest amount the buyer is willing to pay for an item, respectively. The asking price 512 and the maximum price 514 may be, for example, selected by the buyer (e.g., when the buyer selects one of a number of price selections determined by the controller 200) or be determined by the controller 200 based on information received from the buyer (e.g., based on the item category 506, the matching code 508, and/or the quality class 510).

The status 516 represents the status of the OTB. For example, when the OTB is initially received it may be assigned a status 516 of "open." When the OTB is being evaluated as a possible match for an OTS, it may be assigned a status 516 of "pending."

When the OTB is matched with an OTS, it may be assigned a status 516 of "filled." When the buyer has purchased and received the item from a seller, the OTB may be assigned a status 516 of "complete." Finally, if an expiration date associated with the OTB has passed, it may be assigned a status 516 of "expired" (i.e., it will not be considered as a possible match in the future).

Thus, FIG. 5 depicts a database in which the data is organized according to a data structure according to an embodiment of the present invention. The data structure includes an offer to buy data object (i.e., the offer to buy identifier 502) representing an offer to purchase an item; and a matching code data object 508 representing information that may be used to match the OTB with an OTS.

Offer to Sell Database

Referring to FIG. 6, a table represents one embodiment of the offer to sell database 600 that may be stored at the controller 200 according to an embodiment of the present invention. The table includes entries each identifying an offer to sell an item. The table also defines fields 602, 604, 606, 608, 610, 612, 614, 616 for each of the entries. The fields specify: an offer to sell identifier 602; a date received 604; an item category 606; a matching code 608; a quality class 610; an asking price 612; a minimum price 614; and a status 616. The information in the offer to sell database 600 may be created and updated, for example, when at OTS is received from a seller.

The offer to sell identifier 602 may be, for example, an alphanumeric code associated with a seller's offer to sell an item. The offer to sell identifier 602 may be, for example, generated by the controller when a seller submits an OTS and may be based on the associated offers to sell 410 stored in the seller database 400. The date received may indicate the date (and time of day) that the OTS was received by the controller 200.

The item category 606 may be, for example, an alphanumeric code and may indicate the type of item the seller is interested in selling. The item category 606 may be, for example, selected by the seller or be determined by the controller 200 based on information received from the seller.

The matching code 608 may be, for example, an alphanumeric code and may indicate in detail the type of item the seller is interested in selling (e.g., including an age of the item, one or more features associated with the item and a product manufacturer). The matching code 608 may be, for example, determined by the controller 200 based on information received from the seller. The quality class 610 may be, for example, an alphanumeric code and may indicate a level of quality associated with the item the seller is interested in selling. The quality class 610 may be, for example, selected by the seller. The quality class 610 may instead be determined by the controller 200 based on information received from the seller (e.g., based on the item category 606, the matching code 608, the asking price 612, and/or the minimum price 614).

The asking price 612 and the minimum price 614 may represent an amount the seller would like to receive and the lowest amount the seller is willing to accept in exchange for an item, respectively. The asking price 612 and the maximum price 614 may be, for example, selected by the seller (e.g., when the seller selects one of a number of price selections determined by the controller 200) or be determined by the controller 200 based on information received from the seller (e.g., based on the item category 606, the matching code 608, and/or the quality class 610).

The status 616 represents the status of the OTS. For example, when the OTS is initially received it may be assigned a status 616 of "unmatched." When the OTS is being evaluated as a possible match for an OTB, it may be assigned a status 616 of "pending." When the OTS is matched with an OTB, it may be assigned a status 616 of "filled." When the seller has sold and provided the item to a buyer, the OTS may be assigned a status 616 of "complete." Finally, if an expiration date associated with the OTS has passed, it may be assigned a status 616 of "expired" (i.e., it will not be considered as a possible match in the future).

Thus, FIG. 6 depicts a database in which the data is organized according to a data structure according to an embodiment of the present invention. The data structure includes an offer to sell data object (i.e., the offer to sell identifier 602) representing an offer to sell an item; and a matching code data object 608 representing information that may be used to match the OTS with an OTB.

Item Category Database

Figure 7:
FIG. 7 is a tabular representation of a portion of an item category database according to an embodiment of the present invention.

Referring to FIG. 7, a table represents one embodiment of the item category database 700 that may be stored at the controller 200 according to an embodiment of the present invention. The table includes entries identifying item categories. The table also defines fields 702, 704 for each of the entries. The fields specify: an item category identifier 702; and a category description. The information in the item category database 700 may be created and updated, for example, by an operator associated with the controller 200 and/or based on information received from buyers, sellers (e.g., when a predetermined number of sellers become interested in offering a new type of item for sale via the controller 200), and/or product manufacturers.

The item category identifier 702 may be, for example, an alphanumeric code associated with a type of item that may be exchanged via the controller 200. The item category identifier 702 may also be based on, or associated with, the item category identifier 506 stored in the offer to buy database 500 and/or the item category identifier 606 stored in the offer to sell database 600. For each item category, the item category database 700 also stores the associated category description 704. The category description 704 may be, for example, a textual, graphical, and/or audio description of the item category. The category description 704 may be transmitted, for example, to a seller device 10 or a buyer device 20 to help the seller or buyer determine an appropriate item category.

Quality Class Database

Referring to FIG. 8, a table represents one embodiment of a record of the quality class database 800 that may be stored at the controller 200 according to an embodiment of the present invention. The table includes records associated with an item category. Each record includes entries identifying features that may be associated with an item in that category.

The table also defines fields 804, 806, 808, 810 for each of the entries. The fields specify: a feature 804; a good class 806; a better class 808; and a best class 810. The information in the quality class database 800 may be created and updated, for example, by an operator associated with the controller 200 and/or based on information received from buyers, sellers, and/or manufacturers.

The item category identifier 802 may be, for example, an alphanumeric code associated with a type of item that may be exchanged through the controller 200. The item category identifier 802 may also be based on, or associated with, the item category identifier 506 stored in the offer to buy database 500, the item category identifier 606 stored in the offer to sell database 600, and/or the item category identifier 702 stored in the item category database 700.

For each item category identifier 802, the quality class database 800 may also store a feature 804 associated with the item category, along with an indication of whether the feature is associated with one or more quality classes (i.e., good class 806, better class 808, and best class 810).

For example, the record illustrated in FIG. 8 represents the item category identifier of "I-C111" which, as shown by the category description 704 in FIG. 7 is associated with a "point and shoot camera." Referring again to FIG. 8, a point and shoot camera may have a feature 804 identified as "2× zoom lens," and such a 2× zoom lens is associated with the best class 810 and the better class 808 (i.e., as reflected by the "yes"), but not with the good class 806 (i.e., as reflected by the "---").

The feature 804 may also indicate which manufacturers are associated with each quality class and a suggested price range that is appropriate for each quality class.

Matching Objectives Database

Referring to FIG. 9, a table represents one embodiment of the matching objectives database 900 that may be stored at the controller 200 according to an embodiment of the present invention. The table includes entries identifying categories of rules that may be used when matching an OTS and an OTB. The table also defines fields 902, 904, 906, 908 for each of the entries. The fields specify: a rule category identifier 902; a rule category description 904; a matching priority 906; and a current rule 908. The information in the matching objectives database 900 may be created and updated, for example, manually by an operator associated with the controller 200 and/or automatically based on the performance of the controller 200 (e.g., based on a profit being made by the controller 200 or a number of transactions being completed via the controller 200).

The rule category identifier 902 may be, for example, an alphanumeric code associated with a set a rules that may be used to match an OTS and an OTB.

For each rule category, the matching objectives database 900 also stores the rule category description 904 that describes the type of rules included in the rule category. For example, the rule category may be described as "pricing rules" (e.g., the rules in the category match an OTS and an OTB based on a price).

According to an embodiment of the present invention, the rules categories are arranged in a hierarchy. That is, each rule category is associated with a matching priority 906 that reflects the order in which different types of rules should be used to match an OTS and an OTB. For example, as illustrated in FIG. 9, pricing rules (having a matching priority 906 of "1") may be used first by the controller 200 when more than one potentially matching OTS exists for an OTB (or vice versa). If more than one potentially matching OTS exists even after the pricing rules are applied (e.g., eliminating some of the potentially matching offers), the controller 200 would next apply the priority ranking rules (having a matching priority 906 of "2"). Such priority ranking rules may, for example, eliminate other offers based on the priority ranking 312 associated with the buyer and the priority ranking 412 associated with the seller. The controller 200 continues to select a rule from each rule category until a single OTS is matched with the OTB. According to one embodiment, a random process may also be used to match an OTS with an OTB (e.g., when a number of different offers may be matched).

The matching priority 906 may be updated, for example, manually by an operator associated with the controller 200 and/or automatically based on the performance of the controller 200 (e.g., the hierarchy may be re-organized based on a profit being made by the controller 200).

The current rule 908 in the matching objectives database 900 indicates which rule in the rule category is currently being applied by the controller 200. For example, there may be a number of different rules in the pricing rules category. In this case, the current rule 908 may reflect which pricing rule should be used by the controller 200 to match an OTS and an OTB.

Rule Database

Referring to FIG. 10, a table represents one embodiment of a record of the rule database 1000 that may be stored at the controller 200 according to an embodiment of the present invention. The table includes records associated with a rule category that may be used to match an OTS and an OTB. Each record includes entries identifying one or more rules in that rule category.

The table also defines fields 1004, 1006 for each of the entries. The fields specify: a rule identifier 1004; and a rule description 1006. The information in the rule database 1000 may be created and updated, for example, manually by an operator associated with the controller 200 and/or automatically based on the performance of the controller 200.

The rule category identifier 1002 may be, for example, an alphanumeric code associated with a set a rules that may be used to match an OTS and an OTB. The rule category identifier 1002 may also be based on, or associated with, the rule category identifier 902 stored in the matching objectives database 900.

For each rule category, the rule database 1000 may also store a rule identifier 1004. The rule identifier may be, for example, an alphanumeric code associated with a particular rule that may be used to match an OTS and an OTB. The rule identifier 1004 may also be based on, or associated with, the current rule 908 stored in the matching objectives database 900.

The rule description 1006 describes the particular rule in the rule category. For example, a particular rule in the pricing rules category may be described as "match all OTB to high OTS" (e.g., all OTB are matched with the OTS having the highest seller price).

Subsidy Rules Database

Referring to FIG. 11, a table represents one embodiment of the subsidy rules database 1100 that may be stored at the controller 200 according to an embodiment of the present invention. The table includes entries identifying rules that may be applied to determine if a subsidy will be added to an OTS and/or an OTB. The table also defines fields 1102, 1104, 1106, 1108 for each of the entries. The fields specify: a subsidy rule identifier 1102; a condition 1104; a subsidy rule 106; and a discrepancy rule 1108. The information in the subsidy rules database 1100 may be created and updated, for example, manually by an operator associated with the controller 200 and/or based on information received from one or more subsidy provider devices 30.

The subsidy rule identifier 1102 may be, for example, an alphanumeric code associated with a rule that may be applied by the controller 200 to determine if a subsidy will be added to an OTS and/or an OTB.

For each subsidy rule, the subsidy rule database 1100 also stores the condition 1104 that must be satisfied in order for the rule to be applied. For example, a rule may only be applied if a price (e.g., a buyer price, or a seller's minimum price) is more than $200.

The subsidy rule 1106 indicates the rule that will be applied by the controller 200 regarding a subsidy that will be added to an OTS and/or an OTB (e.g., a subsidy amount the controller 200 will contribute in order to complete a transaction). For example, a subsidy rule 1106 may comprise adding up to $30 to an OTS.

The discrepancy rule 1108 indicates how the controller 200 may handle any funds that remain after a subsidy is used with respect to an OTS and/or an OTB. For example, the controller may add $10 in order to match an OTB having a maximum price 514 of $90 with an OTS having a minimum price 614 of $95. In this case, the controller 200 may keep the extra $5, or provide the extra amount to the seller and/or the buyer.

Subsidy Database

Referring to FIG. 12, a table represents one embodiment of the subsidy database 1200 that may be stored at the controller 200 according to an embodiment of the present invention. The table includes entries identifying subsidies that may be offered to a buyer and/or a seller. The table also defines fields 1202, 1204, 1206, 1208 for each of the entries. The fields specify: a subsidy identifier 1202; a subsidy provider 1204; a subsidy description 1206; and a current balance 1208. The information in the subsidy database 1200 may be created and updated, for example, based on information received from a subsidy provider device 30.

The subsidy identifier 1202 may be, for example, an alphanumeric code associated with a subsidy that may be offered via the controller 200. The subsidy identifier may be based on, or associated with, the accepted subsidy offers 315 stored in the buyer database 300 and/or the accepted subsidy offers 416 stored in the seller database 400. The subsidy provider 1204 may indicate the party that is supplying funds for the subsidies. For example, the subsidy provider 1204 may be a manufacturer, a third party or the controller 200.

The subsidy description 1206 may be a textual, graphical, or audio description of the subsidy offer. For example, the subsidy description 1206 may indicate that $50 will be added to an OTB if the buyer subscribes to a long distance service associated with the subsidy provider 1204. The current balance 1208 may indicate an amount of available funds that may be used to provide subsidies to buyers and/or sellers. For example, the current balance 1208 may be increased based on information received from a subsidy provider device 30 (e.g., when the subsidy provider adds money to the subsidy account maintained by the controller 200) and decreased each time a buyer or a seller accepts the subsidy (e.g., by agreeing to perform a task). According to one embodiment, a penalty may be applied to a buyer or a seller who accepted a subsidy offer but failed to perform a task.

Transaction Database

Referring to FIG. 13, a table represents one embodiment of the transaction database 1300 that may be stored at the controller 200 according to an embodiment of the present invention. The table includes entries identifying transactions that have been filled or completed via the controller 200. The table also defines fields 1302, 1304, 1306, 1308, 1310, 1312, 1314, 1316 for each of the entries. The fields specify: a transaction identifier 1302; an offer to sell identifier 1304; an offer to buy identifier 1306; a price 1308; a fill date 1310; a complete date 1312; a buyer subsidy 1314; and a seller subsidy 1316. The information in the transaction database 1300 may be created and updated, for example, when an OTB and an OTS are matched.

The transaction identifier 1302 may be, for example, an alphanumeric code associated with a transaction that has been filled (e.g., matched) or completed via the controller 200. The transaction identifier may, for example, be generated by the controller 200 when an OTB and an OTS are matched.

For each transaction, the transaction database 1300 stores the offer to sell identifier 1304 and the offer to buy identifier 1306 associated with the OTS and OTB, respectively, that have been matched by the controller 200. The offer to sell identifier 1304 may be based on, or associated with, the offer to sell identifier 602 stored in the offer to sell database 600. The offer to buy identifier 1306 may be based on, or associated with, the offer to buy identifier 502 stored in the offer to buy database 500.

The price 1308 stored in the transaction database 1300 may indicate an amount the buyer will provide in exchange for an item and/or an amount a seller will receive in exchange for providing the item to the buyer. The fill date 1310 may indicate the date on which an OTS was matched with an OTB and the complete date 1312 may indicate a date on which the transaction has been completed (e.g., a date on which the item has been provided to the buyer, the buyer has provided payment of the price 1308, and/or the seller has received the price 1308). The buyer subsidy 1314 and the seller subsidy 1316 may indicate a subsidy amount that has been applied to an OTB and/or an OTS, respectively, during the transaction.

Methods that may be used in connection with the transaction system 100 according to an embodiment of the present invention will now be described in detail with respect to FIGS. 14 through 23. In particular, FIGS. 14 through 16 and 23 illustrate some general embodiments, while FIGS. 17 through 22 illustrate more detailed embodiments according to the present invention.

Transaction System Methods

Figure 14:
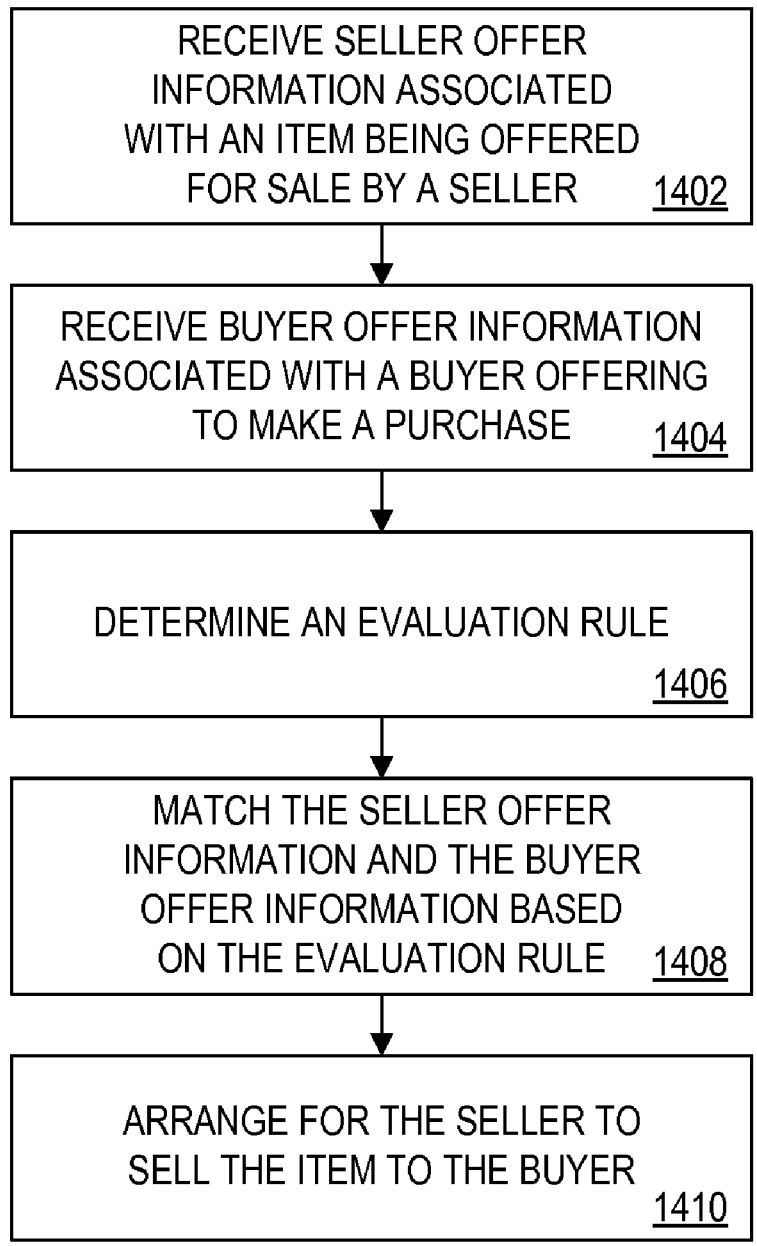
FIG. 14 is a flow chart of a method according to an embodiment of the present invention.

FIG. 14 is a flow chart illustrating a method which may be performed by a controller 200 according to an embodiment of the present invention. The flow chart depicted in FIG. 14, as well as the other flow charts discussed herein, is not intended to imply a fixed order to the elements shown therein, and embodiments of the present invention can be practiced in any order that is practicable.

At 1402, seller offer information is received. The seller offer information may comprise, for example, registration information and/or an OTS associated with an item being offered for sale by a seller. The seller offer information may be received, for example, from a seller device 10 via a Web site, the Internet, a seller computer, a PDA, a kiosk, an electronic mail message, a telephone, an interactive voice response unit, and/or an operator. The seller offer information may include, for example, an item category, an item quality class, at least one item feature, a seller price, an age associated with the item, an item manufacturer, an item description, an item image, an item condition, an accessory associated with the item, a seller offer period, seller delivery information, seller payment information, a seller evaluation rule, and/or a seller preference.

At 1404, buyer offer information is received. The buyer offer information may comprise, for example, an OTB associated with a buyer offering to make a purchase. The buyer offer information may be received, for example, from a buyer device 10 via a Web site, the Internet, a buyer computer, a PDA, a kiosk, an electronic mail message, a telephone, an interactive voice response unit, and/or an operator. The buyer offer information may include, for example, an item category, an item quality class, at least one item feature, a buyer price, an age associated with the item, one or more acceptable item manufacturers, an item description, an item image, an item condition, a buyer offer period, buyer delivery information, buyer payment information, a buyer evaluation rule, and a buyer preference.

At 1406, an evaluation rule is determined. According to one embodiment of the present invention, the evaluation rule automatically determined based on revenue management information associated with the controller 200, such as an amount of profit associated with the controller and/or a number of transactions associated with the controller. According to another embodiment, the evaluation rule is determined manually by an operator associated with the controller 200. In either case, the evaluation rule may be selected from a plurality of possible evaluation rules. According to another embodiment, the evaluation rule is determined by retrieving a predetermined evaluation rule (e.g., a stored evaluation rule).

According to another embodiment, the controller 200 measures a current performance parameter (e.g., a rate at which transactions are being completed), and the evaluation rule is determined based on this measurement (e.g., a certain evaluation rule traditionally has worked well during a holiday season).

According to another embodiment, the evaluation rule is determined based on a matching objective. The matching objective may be, for example, to increase a profit associate with the transactions and/or to increase a total number of transactions.

According to one embodiment of the present invention, the evaluation rule comprises not matching the buyer with at least one predetermined seller (e.g., when the buyer and that seller have had a problem during a past transaction) and/or not matching the seller with at least one predetermined buyer.

The evaluation rule may also be based on, for example, when the buyer offer information is received and/or when the seller offer information is received (e.g., an older offer may be matched before a newer offer).

The evaluation rule may also be based on information associated with the controller 200. For example, the information associated with the controller 200 may comprise an amount of profit associated with the transaction for the controller 200, a current overall level of profit associated with the controller 200, information associated with another controller 200, a total number of buyer offers pending in the controller 200 for similar items, and a total number of seller offers pending in the controller 200 for similar items.

The evaluation rule may also be based on information associated with the seller, such as, for example, a seller location, a seller transaction history, a seller reputation, a seller payment identifier, demographic information associated with the seller, psychographic information associated with the seller, a credit rating associated with the seller, other offers to sell associated with the seller, other offers to buy associated with the seller, and/or an amount of profit associated with the transaction for the seller.

The evaluation rule may also be based on information associated with the buyer, such as, for example, a buyer location, a buyer transaction history, a buyer reputation, a buyer payment identifier, demographic information associated with the buyer, a credit rating associated with the buyer, psychographic information associated with the buyer, other offers to sell associated with the buyer, other offers to buy associated with the buyer, and/or an amount of profit associated with the transaction for the buyer.

The evaluation rule may also be based on information associated with the item, such as, for example, a past popularity of the item, a current popularity of the item, and/or a predicted future popularity of the item.

At 1408, the seller offer information and the buyer offer information are matched base d on the evaluation rule.

According to one embodiment, a buyer offer code is determined based on the buyer offer information, and a seller offer code is determined based on the seller offer information. The buyer offer code may then be matched with the seller offer code based on the evaluation rule. For example, the buyer offer code may be associated with a set of possible items, and the matching may comprise determining that the seller offer code is associated with a subset of the set of possible items.

According to another embodiment, the controller 200 determines an item quality class associated with the item based on the seller offer information. The buyer offer information may then be matched based on the quality class. Similarly, the controller 200 may determine an item quality class associated with the item based on the buyer offer information. The seller offer information may then be matched based on the quality class. In either case, the item quality class may based on, for example, an item category, at least one item feature, an item price (e.g., a seller price or a buyer price), an age associated with the item, an item manufacturer, an item description, an item image, an item condition, and/or an accessory associated with the item.

According to another embodiment, the seller offer information includes a seller price (e.g., a buyer asking price and/or a buyer maximum price), and the buyer offer information includes a buyer price (e.g., a seller asking price and/or a seller minimum price). In this case, the matching may be performed based on the seller price and the buyer price. For example, an OTS having a minimum price of $5.00 may be matched with an OTB having a maximum price of $6.00 but not with an OTB having a maximum price of $4.00. That is, according to one embodiment, the seller price must be less than or equal to the buyer price. According to another embodiment, however, the seller price may be greater than the buyer price (e.g., the controller 200 or any other party may subsidize the transaction). According to another embodiment, the seller price and buyer price may not even be considered when the matching is performed by the controller 200.

According to another embodiment, the seller offer information includes a seller address, and the buyer offer information includes a buyer address. In this case, the matching may be performed based on the seller address and the buyer address (e.g., an OTS may be matched with an OTB if the seller lives within five miles of the buyer). According to another embodiment, an OTS may be matched with an OTB if both the seller and the buyer live (or work) within a predetermined distance of a third party address. For example, an OTS may be matched with an OTB if both the seller and the buyer live within five miles of a MCDONALD'S® restaurant.

According to another embodiment, the seller offer information includes at least one transaction requirement, and buyer offer information will only be considered a match if the buyer offer information complies with the transaction requirement (e.g., the buyer has a predetermined reputation rating). According to another embodiment, the buyer offer information includes at least one transaction requirement, and seller offer information will only be considered a match if the seller offer information complies with the transaction requirement (e.g., the seller has been the only owner of the item).

According to another embodiment, the seller offer information includes at least one transaction preference, and buyer offer information is more likely to be considered a match if the buyer offer information complies with the transaction preference (e.g., the buyer should preferably be a METS® fan). According to another embodiment, the buyer offer information includes at least one transaction preference, and seller offer information is more likely to be considered match if the seller offer information complies with the transaction preference (e.g., the seller should preferably be over 65 years old).

According to one embodiment, the seller offer information may potentially be matched with a plurality of buyer offers, and the controller 200 selects one of the buyer offers. The buyer offer may be selected, for example, based on priority rankings associated with the buyer offers. The priority rankings may be based on, for example, priority payments, other seller offers for similar items, other buyer offers for similar items, transaction histories, seller offer information, and/or the buyer offer information.

According to another embodiment, the buyer offer information may potentially be matched with a plurality of seller offers, and the controller 200 selects one of the seller offers. The seller offer may be selected, for example, based on priority rankings associated with the seller offers. The priority rankings may be based on, for example, priority payments, other seller offers for similar items, other buyer offers for similar items, transaction histories, the seller offer information, and/or buyer offer information.

According to one embodiment, the controller 200 periodically attempts to match an OTS with an OTB. According to another embodiment, the controller 200 periodically attempts to match an OTB with an OTS. The controller 200 may also evaluate offers, for example, when a new OTS and/or OTB is received.

At 1410, the controller arranges for the seller to sell the item to the buyer. According to one embodiment, a seller offer is "binding" in that the seller is obligated to sell the item subsequent to said matching. In this case, the controller 200 may arrange for the seller to provide payment of a penalty amount if the seller does not sell the item. According to another embodiment, a buyer offer is "binding" in that the buyer is obligated to purchase the item subsequent to said matching. In this case, the controller 200 may arrange for the buyer to provide payment of a penalty amount if the buyer does not purchase the item. Note that both the seller offer and the buyer offer may be binding or neither the seller offer nor the buyer offer may be binding.

Figure 15:
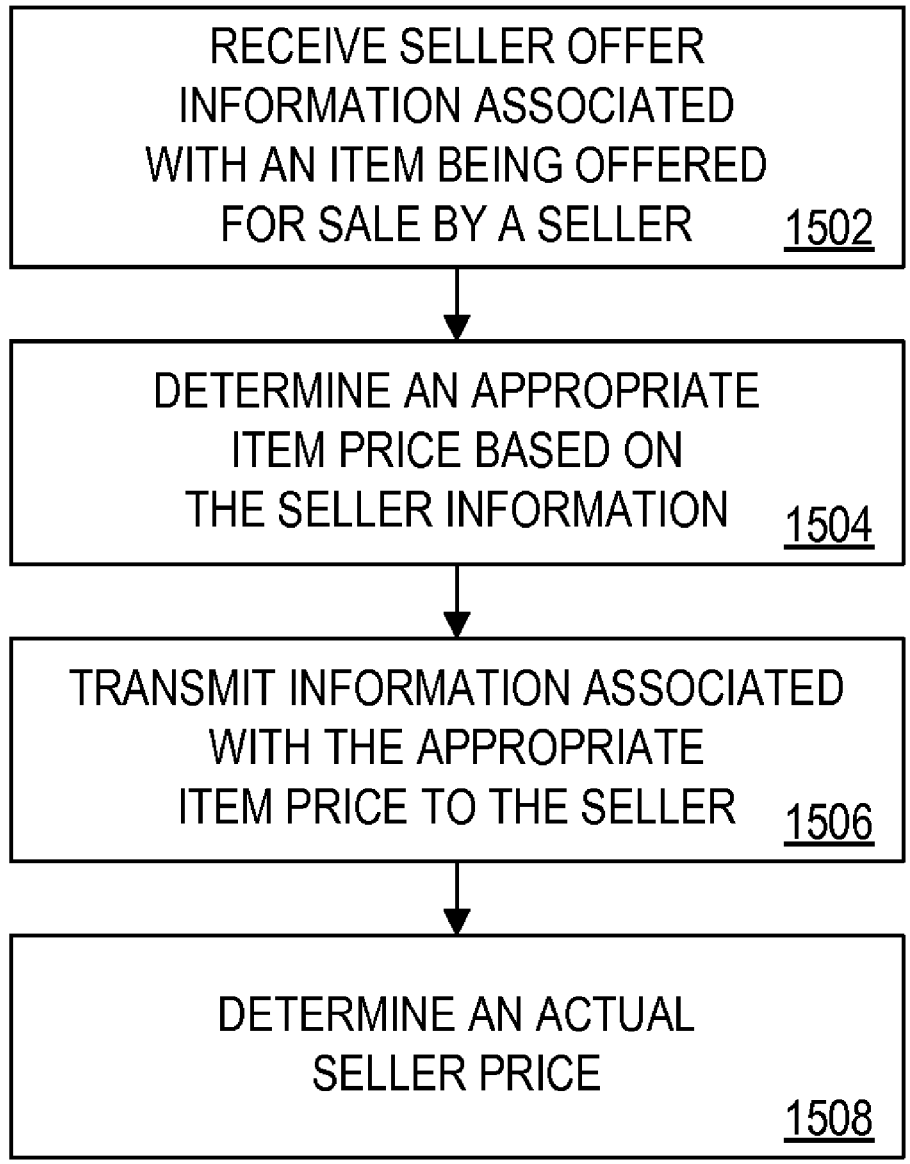
FIG. 15 is a flow chart of a method according to another embodiment of the present invention.

FIG. 15 is a flow chart of a method according to another embodiment of the present invention. At 1502, seller offer information is received. The seller offer information may comprise, for example, registration information and/or an OTS associated with an item being offered for sale by a seller.

At 1504, an appropriate item price is determined based on the seller offer information. According to another embodiment, the appropriate item price is further based on a matching objective, such as to increase a profit associated with the transaction and/or to increase a total number of transactions.

According to an embodiment of the present invention, an item quality class is determined based on the seller offer information. For example, based on an item manufacturer and one or more item features, the controller 200 may determine that an item is in the "better" class. The appropriate item price may then be determined based on the item quality class.

At 1506, information associated with the appropriate item price is transmitted to the seller. The information may comprise, for example, the appropriate item price (or appropriate item price range), a probability that the item will be sold at one or more prices, and an average length of time it will take to sell the item at one or more prices. The information may be transmitted to, for example, a seller device 10 via a Web site, the Internet, a seller computer, a PDA, a kiosk, an electronic mail message, a telephone, an interactive voice response unit, and/or an operator.

At 1508, an actual seller price is determined. The actual seller price may be determined, for example, by the controller 200 setting the actual seller price to the appropriate item price (e.g., the controller 200, and not the seller, determines the actual seller price).

According to another embodiment, the controller may receive an adjustment of the appropriate item price from the seller device 10. For example, the seller may indicate that he or she would like to increase the appropriate item price by $5 or 10%. The actual seller price is then determined based on the appropriate item price and the adjustment. According to another embodiment, the actual seller price is determined based on information received from the seller device 10. For example, seller may transmit a seller-defined price to the controller 200.

Note that the method described with respect to FIG. 15 may similarly be performed to transmit an appropriate item price to the buyer and to determine an actual buyer price.

Figure 16:
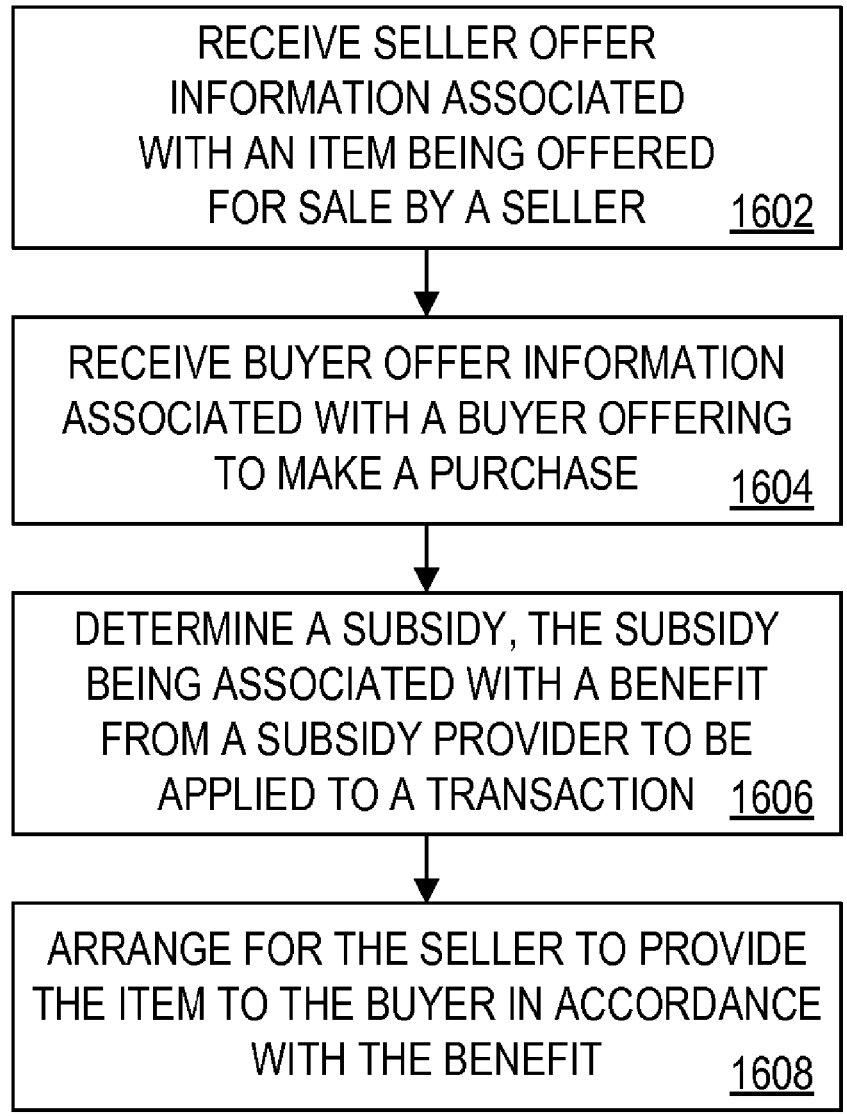
FIG. 16 is a flow chart of a method according to another embodiment of the present invention.

FIG. 16 is a flow chart of a method according to another embodiment of the present invention.

At 1602, seller offer information is received. The seller offer information may comprise, for example, registration information and/or an OTS associated with an item being offered for sale by a seller. At 1604, buyer offer information is received. The buyer offer information may comprise, for example, an OTB associated with a buyer offering to make a purchase.

At 1606, a subsidy is determined. The subsidy is associated with a benefit from a subsidy provider (e.g., the controller 200 or a third party) to be applied to the transaction (e.g., on behalf of a buyer and/or a seller).

The subsidy may be conditioned upon performance of a task by the seller. In this case, the controller 200 may transmit an indication of a subsidy offer to the seller, and receive an indication of acceptance of the subsidy offer from the seller. According to another embodiment, the subsidy is conditioned upon performance of a task by the buyer. In this case, the controller 200 may transmit an indication of a subsidy offer to the buyer, and receive an indication of acceptance of the subsidy offer from the buyer. Note that a subsidy may also be conditioned upon performance of a task by both the buyer and the seller. According to one embodiment, the indication of the subsidy offer is transmitted to the seller and/or the buyer via a Web site, the Internet, a computer, a PDA, a kiosk, an electronic mail message, a telephone, an interactive voice response unit, and/or an operator.

According to one embodiment, a subsidy may be conditioned upon, for example, a buyer and/or a seller submitting another offer to the controller 200, completing another transaction through the controller 200, subscribing to a service, applying for a service, a performance of a task (or a promise to perform a task), and/or a performance of a plurality of tasks.

The subsidy may be determined by the controller 200 based on, for example, information associated with the seller, information associated with the item, information associated with the buyer, information associated with the controller 200, and/or information associated with a third party. The subsidy may also be based on, for example, an item category, an item quality class, at least one item feature, an item price, an age associated with the item, an item manufacturer, an item description, an item image, an item condition, an accessory associated with the item, an offer period, delivery information, payment information, at least one evaluation rule, a location, a transaction history, demographic information, psychographic information, a credit rating, other offers to sell, other offers to buy, and/or an amount of profit associated with the transaction.

At 1608, it is arranged for the seller to provide the item to the buyer in accordance with the benefit. For example, the benefit may comprise a subsidy amount that is added to the buyer price and provided to the seller in exchange for the item.

Figure 17:
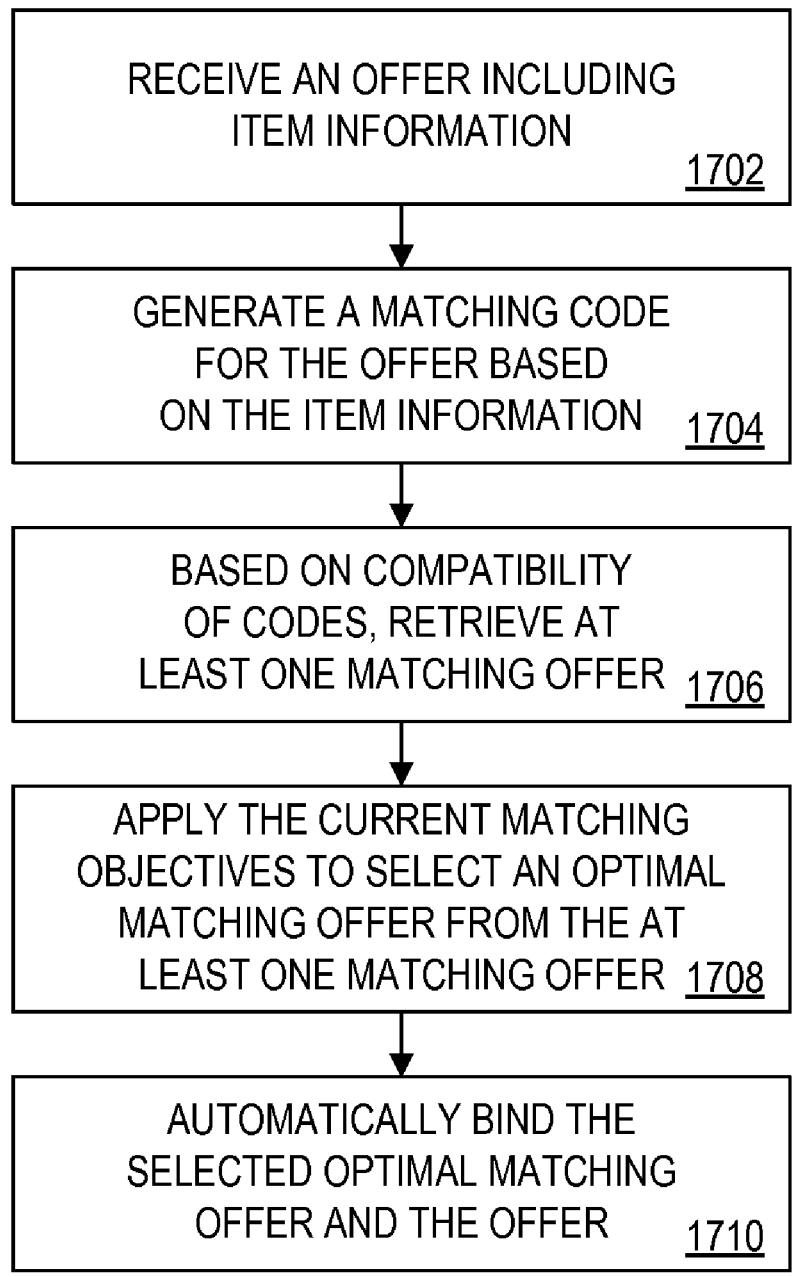
FIG. 17 is a flow chart of a matching method according to an embodiment of the present invention.

FIG. 17 is a flow chart of a matching method according to an embodiment of the present invention. At 1702, the controller 200 receives an offer (i.e., an OTS or an OTB) including item information. Based on the item information, the controller 200 generates a matching code for the item at 1704. The matching code is used to find compatible codes and determine at least one matching offer at 1706. The matching objectives are applied to the determined matching offers at 1708 to select an "optimal" matching offer (e.g., an offer that best satisfies the matching objectives). The controller 200 then automatically matches, or binds, the received offer with the selected offer.

Figure 18A:
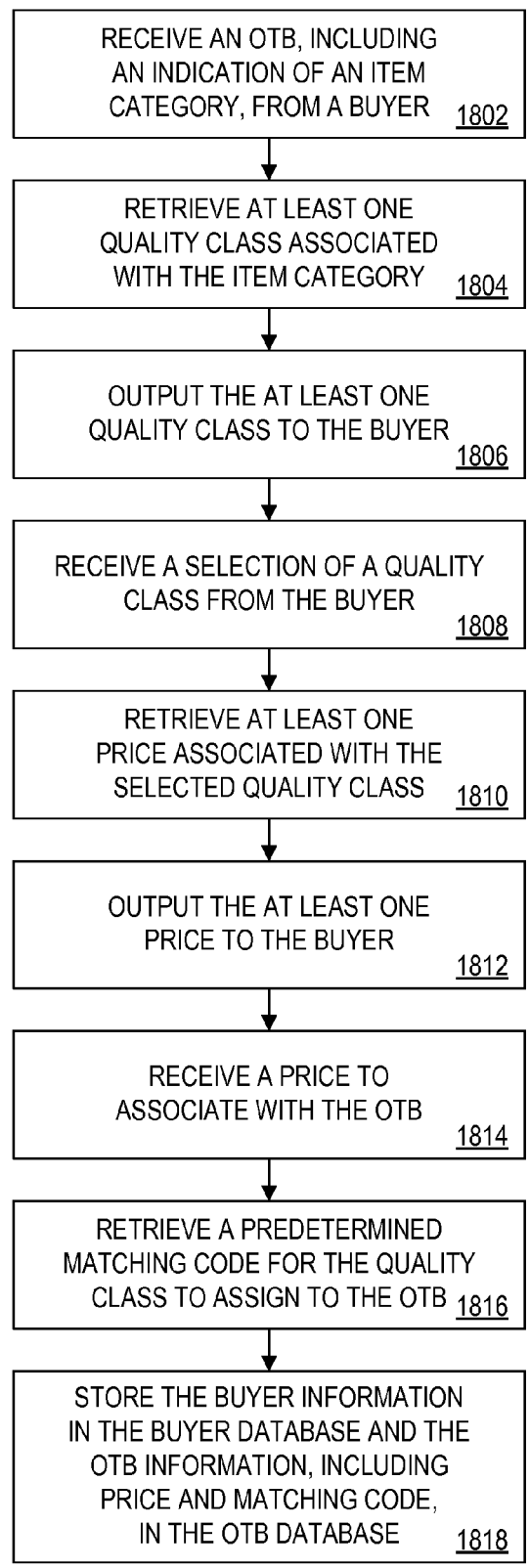
FIG. 18A is a flow chart of an offer to buy method according to an embodiment of the present invention.

FIG. 18A is a flow chart of an offer to buy method according to an embodiment of the present invention. At 1802, an OTB, including an indication of an item category, is received from a buyer (e.g., the buyer is interested in purchasing a "camera"). At least one quality class associated with the item category is retrieved at 1804, and the retrieved quality class or classes are output to the buyer at 1806. A selection of a quality class is then received from the buyer at 1808 (e.g., "best" quality).

At 1810, the controller 200 retrieves at least one price or price range associated with the selected quality class and outputs the retrieved price to the buyer at 1812. The controller 200 then receives a price to associate with the OTB from the buyer at 1814 (e.g., when the buyer selects one of a plurality of appropriate prices).

At 1816, the controller 200 retrieves a predetermined matching code for the received quality class to assign to the OTB, and the buyer information is stored in the buyer database 300. The OTB information, including the price (e.g., as an asking price 512 or a maximum price 514) and matching code 508, is stored in the offer to buy database 500.

Figure 18B:
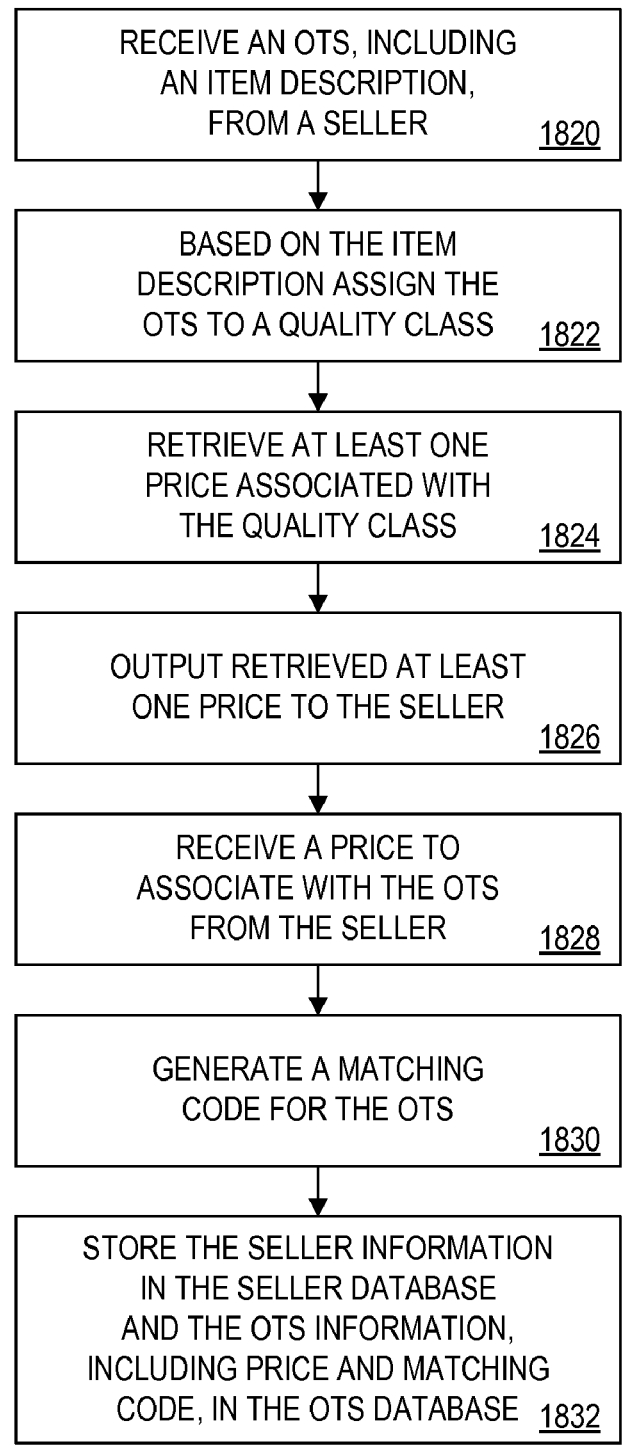
FIG. 18B is a flow chart of an offer to sell method according to an embodiment of the present invention.

FIG. 18B is a flow chart of an offer to sell method according to an embodiment of the present invention. At 1820, an OTS, including an item description, is received from a seller. Based on the item description, the controller 200 assigns the OTS to a quality class.

At 1824, the controller 200 retrieves at least one price or price range associated with the assigned quality class and outputs the retrieved price to the seller at 1826. The controller 200 then receives a price to associate with the OTS from the seller at 1828 (e.g. when the seller selects one of a plurality of appropriate prices).

At 1830, the controller 200 generates a matching code for the OTS, and the seller information is stored in the seller database 400. The OTS information, including the price (e.g., an asking price 612 or a minimum price 614) and the matching code 608, is stored in the offer to sell database 600.

Figure 19:
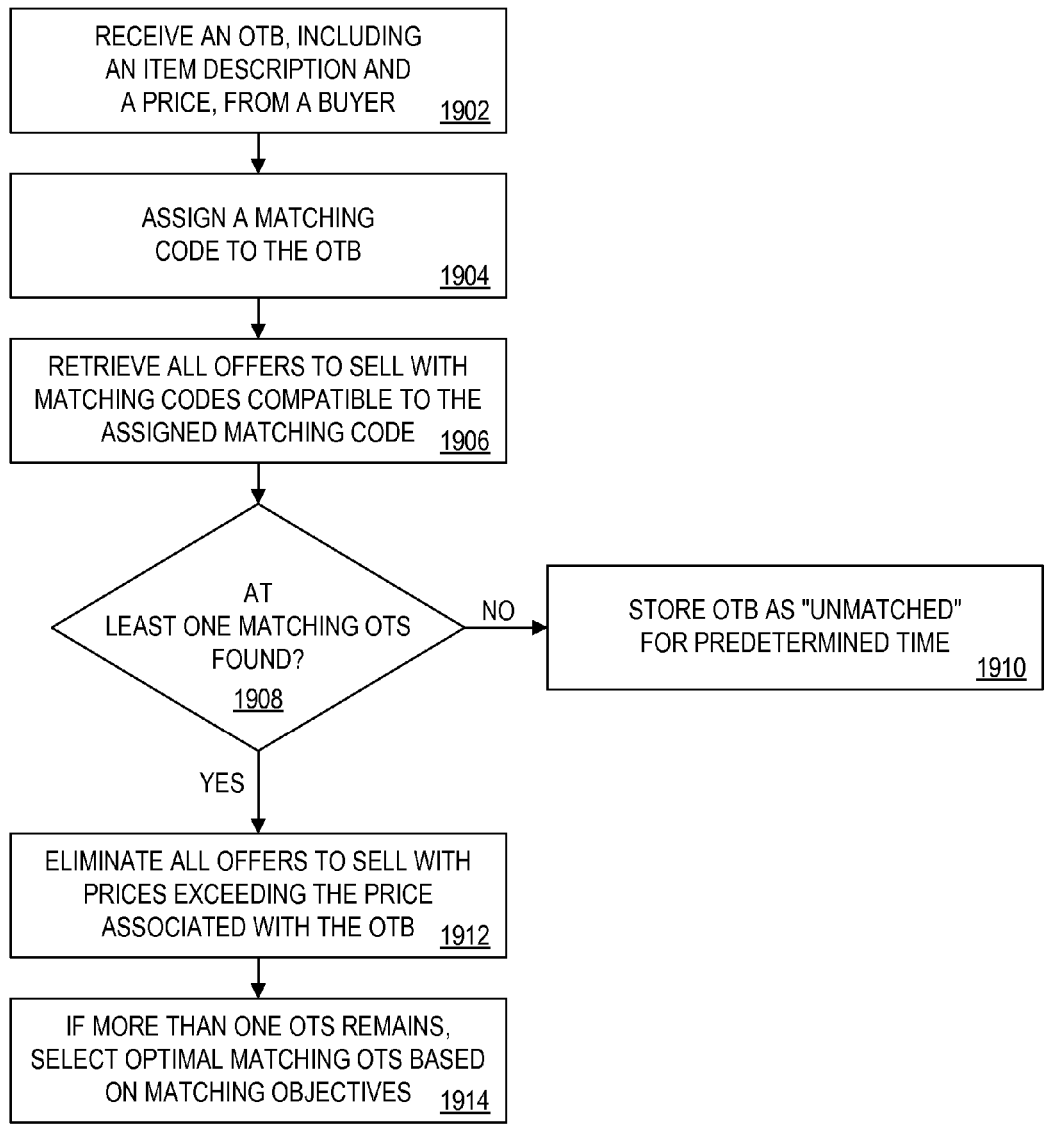
FIG. 19 is a flow chart of a matching method according to an embodiment of the present invention.

FIG. 19 is a flow chart of a preliminary matching method based on the compatibility of matching codes and basic price elimination according to an embodiment of the present invention. At 1902, an OTB, including an item description and a price (e.g., a maximum price 514) are received from a buyer, and a matching code is assigned to the OTB at 1904.

At 1906, each OTS with a matching code that is compatible with the matching code assigned to the OTB is retrieved. If at least one OTS is not found at 1908, the OTB is stored as "unmatched" for a predetermined time (e.g., for twenty four hours) at 1910.

If at least one matching OTS is found at 1908, each OTS with a price (e.g., a minimum price 614) exceeding the OTB price is eliminated at 1912. If more than one OTS still remains, the controller 200 selects an optimal matching OTS based on matching objectives (e.g., based on information in the matching objectives database 900 and rules database 1000).

Figure 20A:
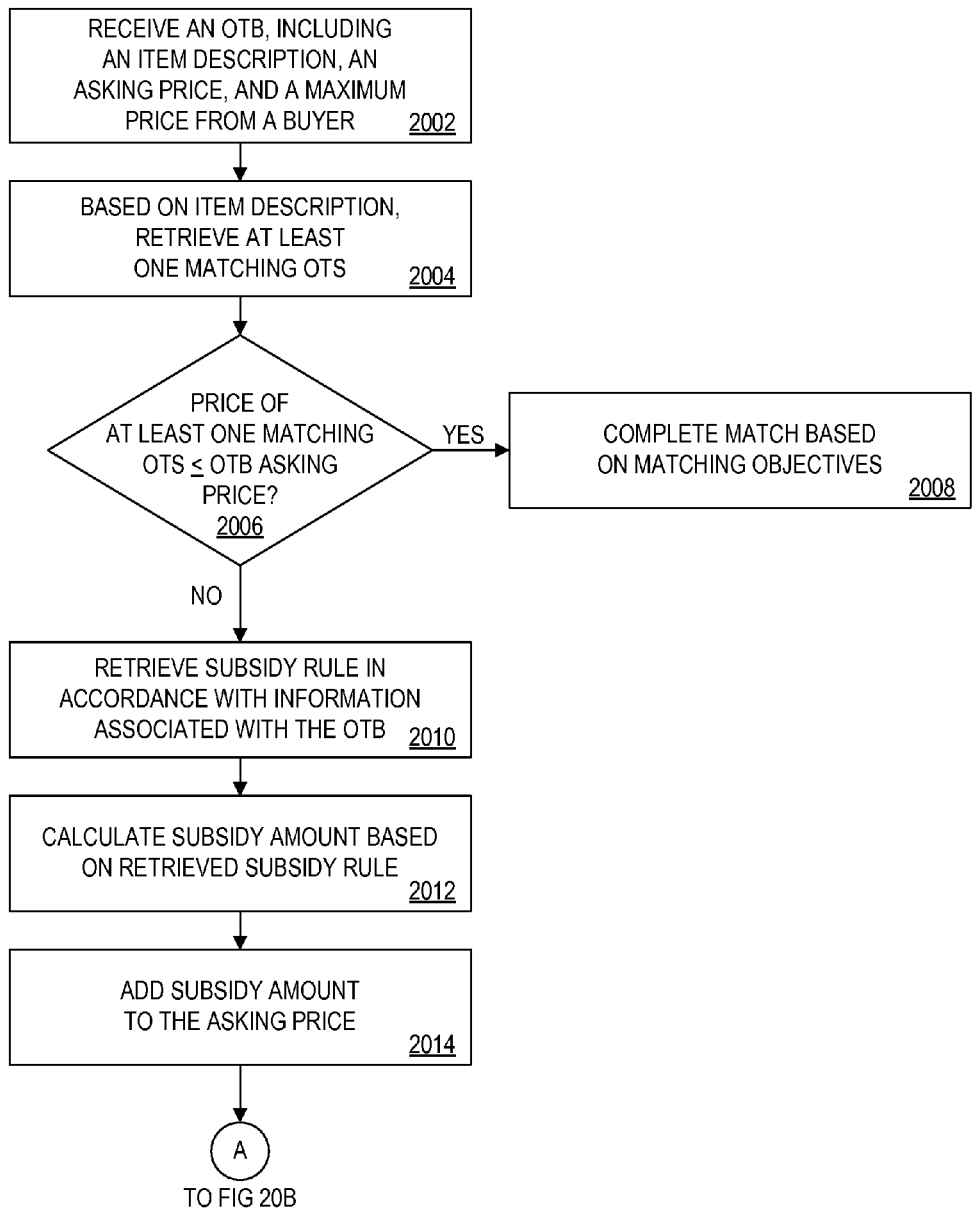
FIGS. 20A through 20C are a flow chart of a subsidy method according to an embodiment of the present invention.
Figure 20B:
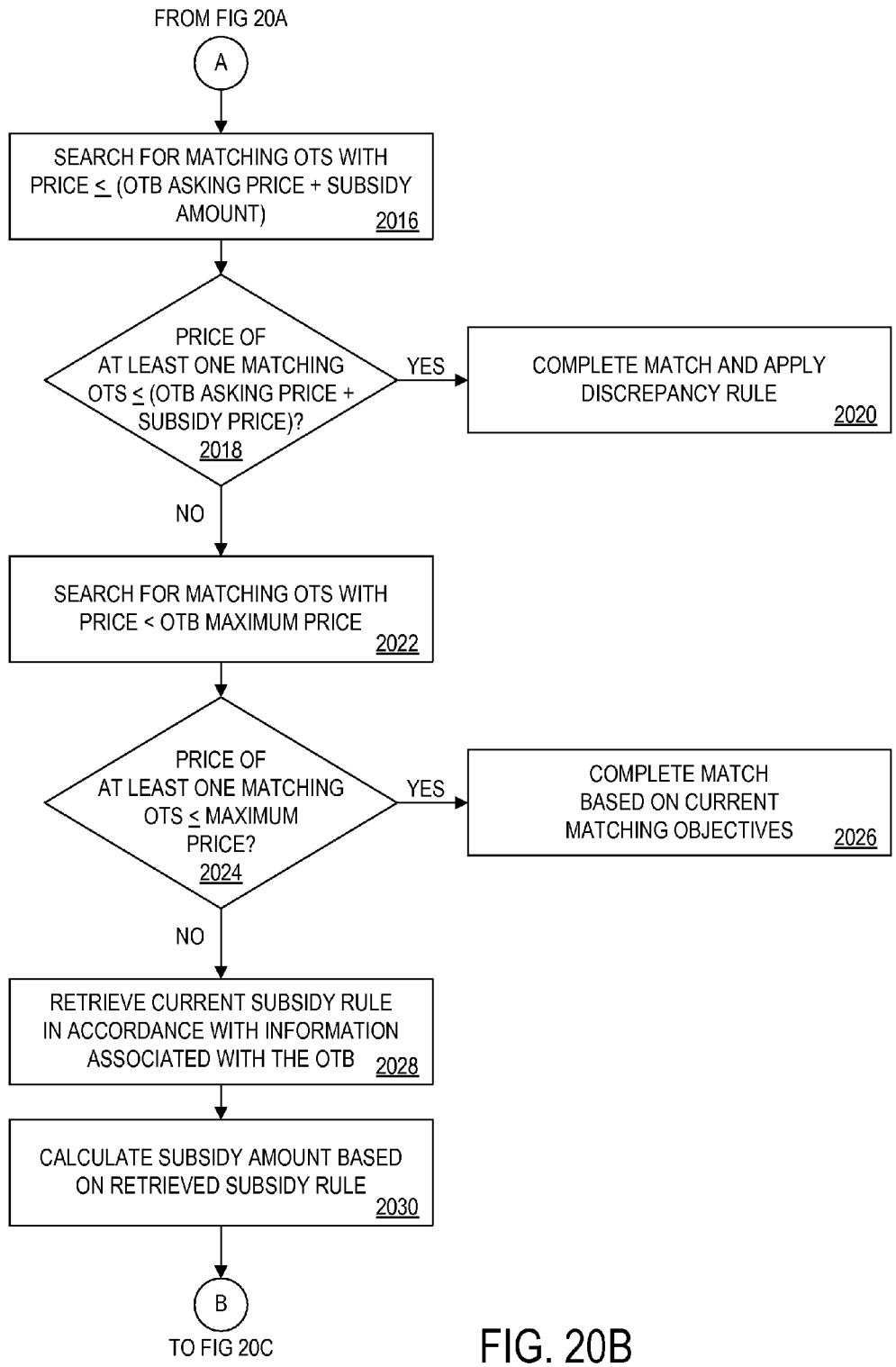
Figure 20C:
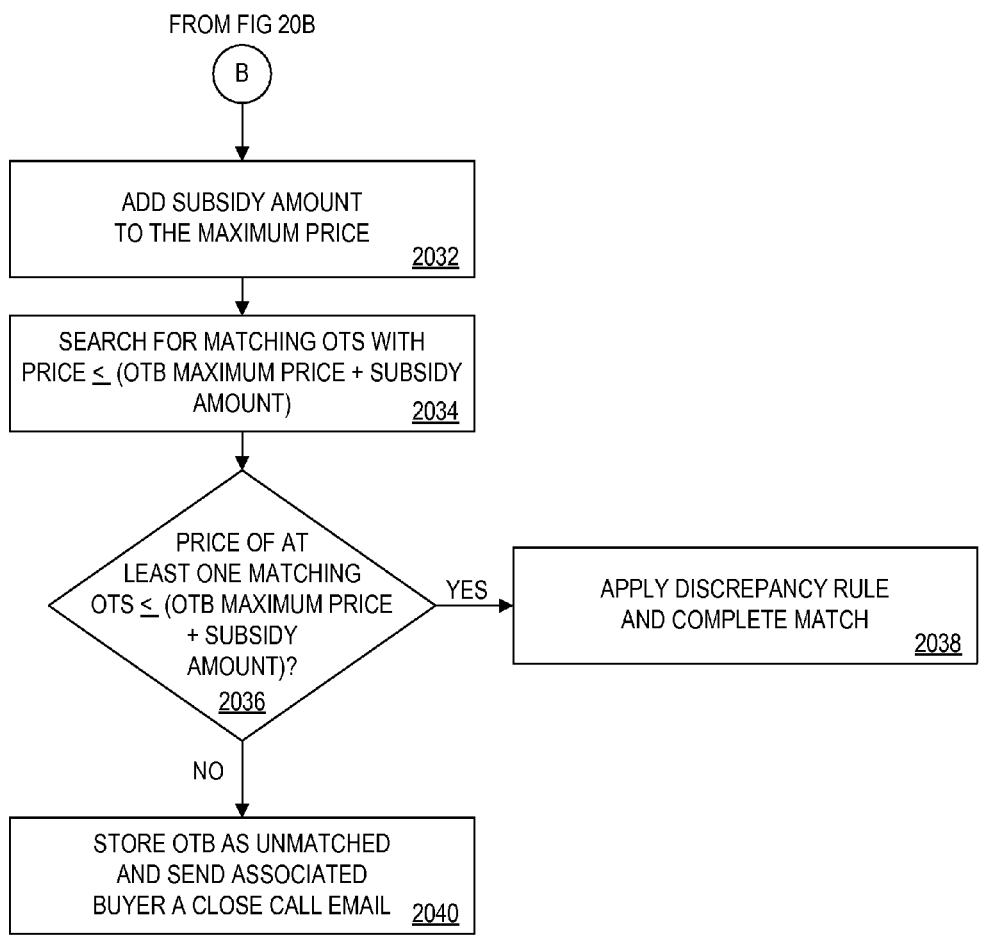

FIGS. 20A through 20C are a flow chart of a subsidy method according to an embodiment of the present invention. At 2002, an OTB is received from a buyer. The OTB includes an item description, an asking price, and a maximum price. Based on the item description, the controller 200 retrieves at least one matching OTS at 2004.

If the price of the matching OTS is less than or equal to the OTB asking price at 2006, the match is completed based on matching objectives at 2008 (e.g., the OTS is selected as a potentially matching offer and the matching objectives may be used to select one of a number of potentially matching offers).

If the price of the matching OTS is more than the OTB asking price at 2006, a subsidy rule is retrieved by the controller 200 in accordance with the information associated with the OTB at 2010. The controller 200 then calculates a subsidy amount based on the retrieved subsidy rule at 2012 and the subsidy amount is added to the OTB asking price at 2014.

The controller then searches for a matching OTS with a price less than or equal to the OTB asking price plus the subsidy amount at 2016. If, at 2018, the price of at least one matching OTS is less than or equal to the OTB asking price plus the subsidy amount, the match is completed at 2020 and a discrepancy rule is applied with respect to any excess funds.

If, at 2018, no OTS has a price less than or equal to the OTB asking price plus the subsidy amount, the controller 200 searches for a matching OTS with a price less than the OTB maximum price at 2022. If, at 2024, the price of at least one matching OTS is less than or equal to the maximum price, the match is completed based on current matching objectives at 2026.

If, at 2024, no OTS has a price less than or equal to the maximum price, a subsidy rule is retrieved by the controller 200 in accordance with the information associated with the OTB at 2028. The controller 200 then calculates a subsidy amount based on the retrieved subsidy rule at 2030 and the subsidy amount is added to the OTB maximum price at 2032.

The controller 200 searches for a matching OTS with a price less than the OTB maximum price plus the subsidy amount at 2034. If, at 2036, the price of at least one matching OTS is less than or equal to the maximum price plus the subsidy amount, the match is completed and a discrepancy rule is applied at 2038.

If, at 2036, no OTS has a price less than or equal to the maximum price plus the subsidy amount, the OTB is stored as unmatched at 2040. An electronic mail message may be sent to the buyer indicating, for example, that a match may be found if his or her maximum price was increased by $5.

Figure 21:
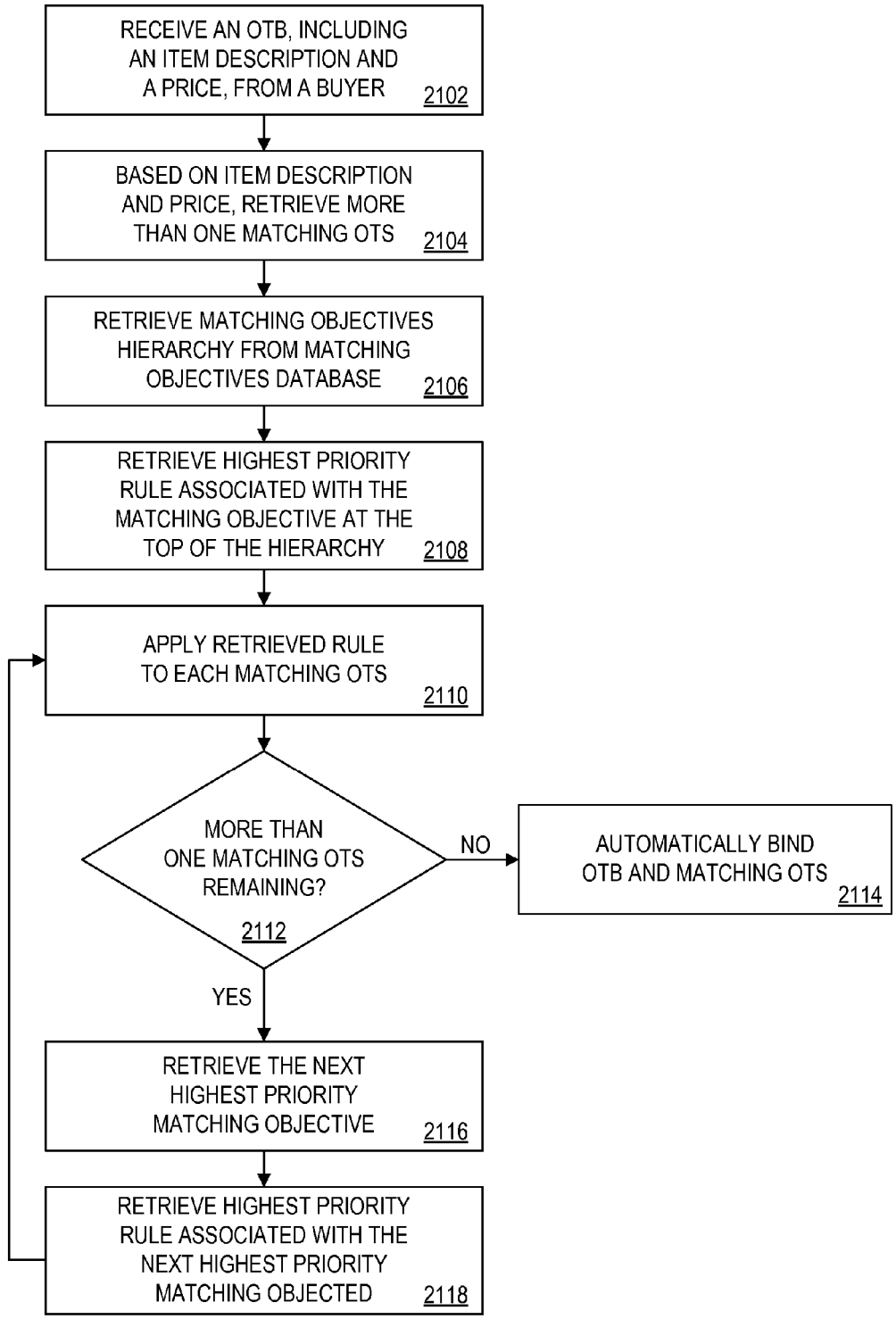
FIG. 21 is a flow chart of a matching objective method according to an embodiment of the present invention.

FIG. 21 is a flow chart of a matching objective method when there is more than one matching OTS for a single OTB according to an embodiment of the present invention. An OTB, including an item description and a price (e.g., a maximum price) is received from a buyer at 2102. Based on the item description and price, more than one matching OTS is retrieved at 2104 from the offer to sell database 600.

Based on the matching objectives hierarchy retrieved from the matching objectives database 900 at 2106, the highest priority rule associated with the matching objective at the top of the hierarchy is retrieved at 2108 from the rule database 1000. The highest priority rule is then applied to each matching OTS at 2110.

If only a single matching OTS remains at 2112, the controller 200 automatically matches and binds that OTS with the received OTB at 2114.

If more than one OTS remains at 2112, the next highest priority matching objective is retrieved from the matching objectives database 900 at 2116. The highest priority rule associated with the next highest priority matching object is retrieved at 2118 from the rule database 1000. This rule is then applied to each remaining OTS at 2110, and the process is repeated until a single OTS is matched to the received OTB.

Figure 22:
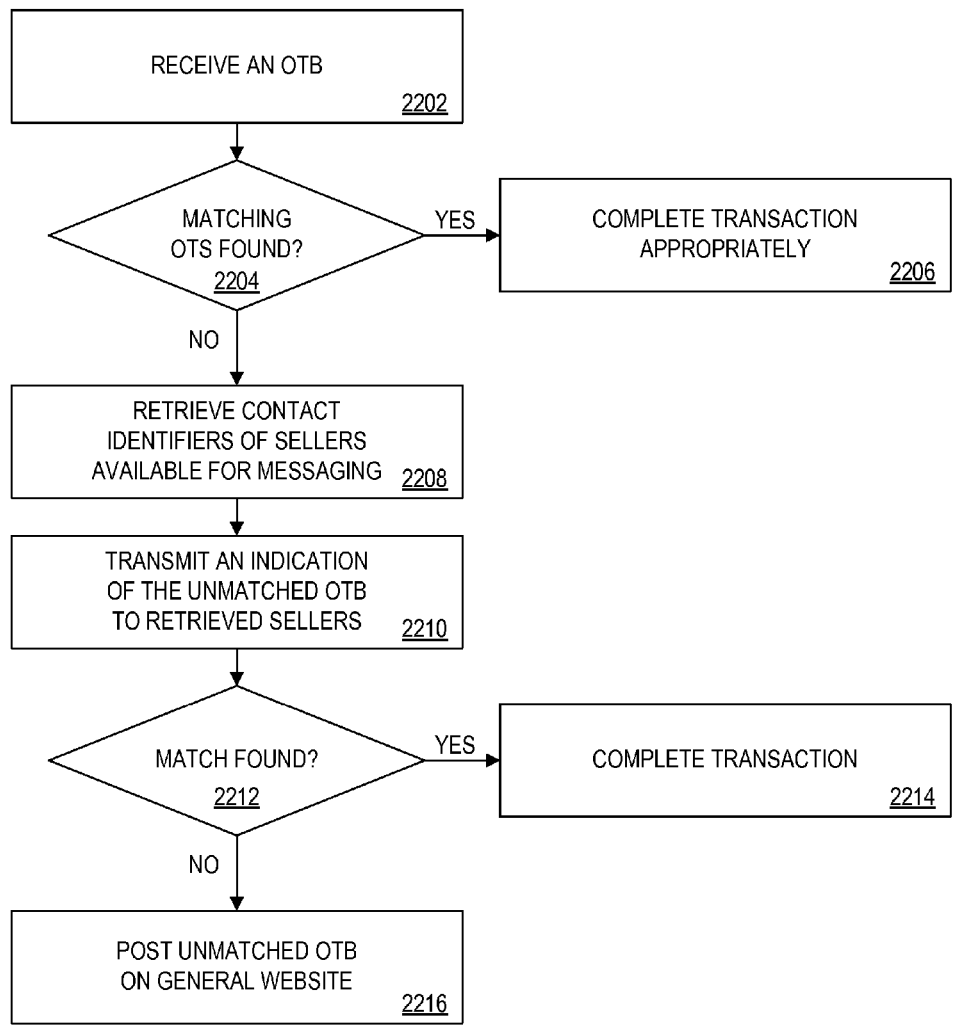
FIG. 22 is a flow chart of a timed-release method according to an embodiment of the present invention.

FIG. 22 is a flow chart of a "timed-release" method according to an embodiment of the present invention. At 2202, an OTB is received. If a matching OTS is found at 2204, the transaction is completed as appropriate at 2206.

If no matching OTS is found at 2204 (e.g., the controller 200 has been unable to match the OTB for a predetermined period of time, such as for one week), the contact identifier 408 of each seller available for messaging (e.g., each seller who requested such messaging when he or she registered with the controller 200) is retrieved at 2208 from the seller database 400. The contact identifier 408 is then used to transmit an indication of the unmatched OTB to those sellers at 2210.

If this results in a match at 2212 (e.g., if one of the contacted sellers accepted the unmatched OTB), the transaction is completed at 2214. If no match is found at 2212, the unmatched OTB is posted on a general Web site that potential sellers may visit to review, and accept, the unmatched OTB.

Thus, the time-release embodiment provides an alternative to rejecting an OTB if it is not automatically matched. This embodiment also enables the controller 200 to have different types of sellers, some of whom pay for receiving various services (e.g., some of whom pay to receive an electronic mail message regarding an unmatched OTB). A similar time-release embodiment may be implemented with respect to an unmatched OTS.

According to one embodiment, a seller may not submit a specific OTS but may instead indicate that he or she is interested in learning about all offers to buy that satisfy some criteria (e.g., all offers to buy associated with any of a list of baseball cards). In this case, the controller 100 may inform the seller of all such offers to buy or only of those offers to buy that are not matched with an OTS. Similarly, a buyer may not submit a specific OTB but may instead indicate that he or she is interested in learning about all offers to sell that satisfy some criteria.

Figure 23:
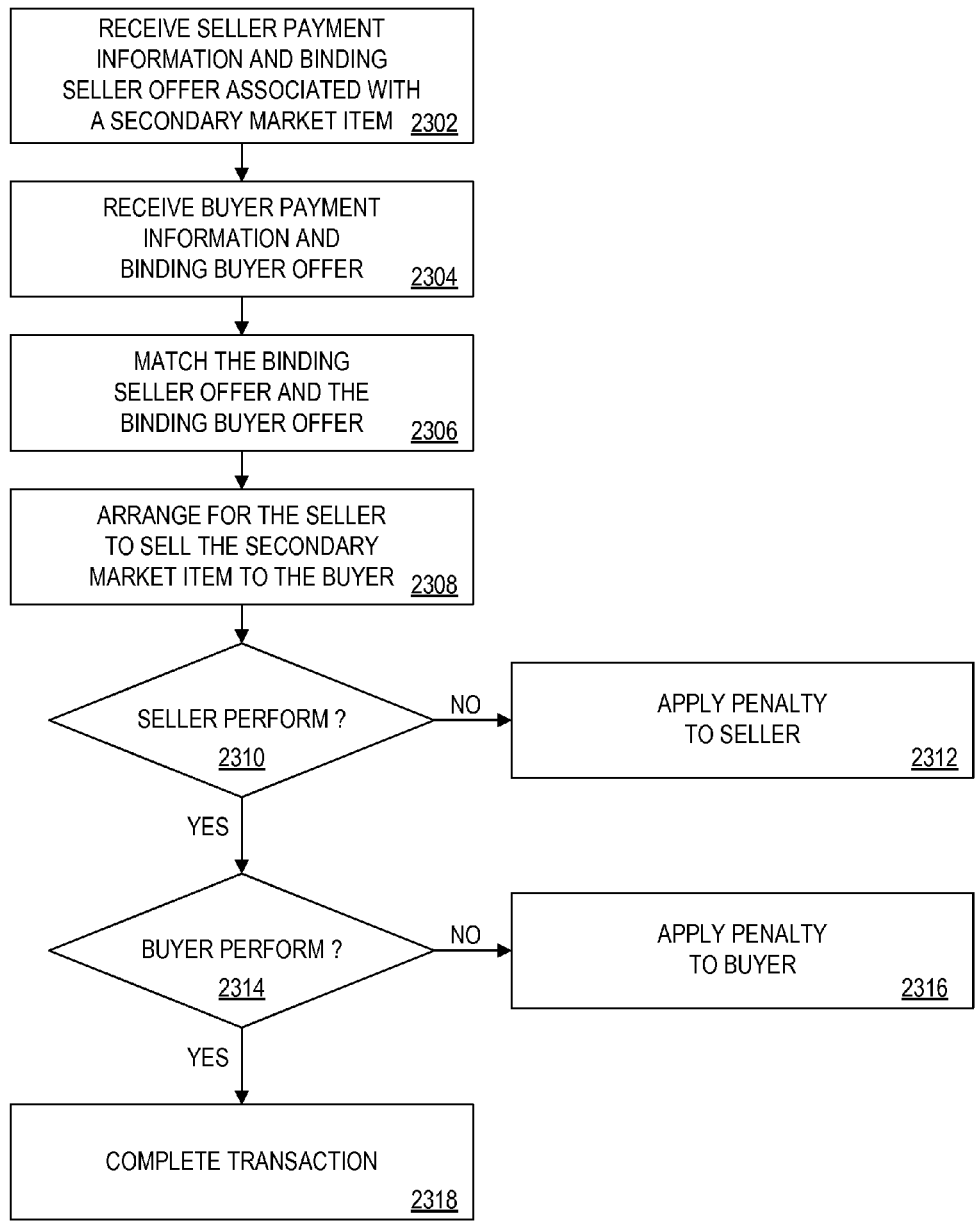
FIG. 23 is a flow chart of a method for arranging a sale of a secondary market item in accordance with an embodiment of the present invention.

FIG. 23 is a flow chart of a method for arranging the sale of a secondary market item in accordance with an embodiment of the present invention. At 2302, seller payment information is received, as is a binding seller offer associated with a secondary market item. At 2304, buyer payment information is received, as is a binding buyer offer associated with a buyer interested in making a purchase.

At 2306, the binding seller offer and the binding buyer offer are matched, and at 2308 it is arranged for the seller to sell the secondary market item to the buyer.

If it is determined at 2310 that the seller has not performed in accordance with the binding seller offer (e.g., the seller has not provided the item), then a penalty is applied to the seller at 2312. The penalty may comprise, for example, having the seller provide payment of a penalty amount (e.g., to the controller 200 and/or the buyer) using the seller payment information. The penalty may also comprise, for example, preventing another offer from the seller and/or adjusting a reputation associated with the seller.

If it is determined at 2314 that the buyer has not performed in accordance with the binding buyer offer (e.g., the buyer has not provided payment in exchange for the item), then a penalty is applied to the buyer at 2316. The penalty may comprise, for example, having the buyer provide payment of a penalty amount (e.g., to the controller 200 and/or the seller) using the buyer payment information. The penalty may also comprise, for example, preventing another offer from the buyer and/or adjusting a reputation associated with the buyer.

If both the seller and the buyer have performed in accordance with their respective offers, the transaction is completed at 2318.

Additional Embodiments

The following are several examples which illustrate additional embodiments of the present invention. These examples do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

According to one embodiment, buyers and sellers can receive periodic updates about the status of their offers. For example, the controller 200 may transmit status information to a buyer or seller along with at least one "close" matching offer. That is, the controller 200 selects an offer that does not match (e.g., does not match based on price or geography) and transmits information about the offer to the buyer and/or seller in a "close-call" electronic mail message. The buyer and/or seller can then determine whether to bind this offer (e.g., by increasing or decreasing an offer price). The buyer and/or seller may pay a fee for such a service.

According to another embodiment, when an OTB cannot be matched the controller 200 determines what aspects of the OTB are preventing a match. The aspects may include, for example, the buyer price, the item quality, and one or more item features. The controller 200 may send an electronic mail message to the buyer describing the aspects of the OTB that should be adjusted to increase the probability that the OTB will be matched. A similar embodiment may be directed to an OTS. In either case, the electronic mail message may further include an incentive to adjust the offer.

According to another embodiment, the controller 200 automatically adjusts an offer price on a periodic basis. For example, a seller may ask that his or her minimum price be lowered by $10 each week until an item is sold. Similarly, a buyer may ask that his or her maximum price be increased by 1% each day until an item is purchased.

According to another embodiment, a buyer and/or seller receives a benefit in exchange for submitting a reasonable offer (e.g., an offer that is more likely to be matched by the controller 200). For example, a buyer may be told that he or she will receive a free warranty (or have a commission fee waived) in exchange for selecting a buyer price within an appropriate item price range.

According to another embodiment, the controller 200 stores commission fee rules. The commission fee rules may be based on, for example, an average item price or seller-defined item price, an item type, and/or a market size for the item. As the market for an item grows or changes, the commission fee may be adjusted to improve, for example, a volume-to-profit ratio.

According to another embodiment, a "ticker-tape" or "zipper" display is used to present information about offers that have been submitted by buyers. Each OTB moves across the zipper display and may be a hyperlink used to receive information, accept the OTB, and/or submit a counter-offer. According to another embodiment, a first zipper displays open offers and a second zipper displays bound offers *along with the length of time to took for the offer to be bound). The seller may specify the types of offers included in the zipper display based on, for example, his or her location and/or an item category. According to another embodiment, the seller may submit an OTS and only be shown an OTB if it potentially matches the seller's OTS. According to another embodiment, the zipper display indicates the minimum price set by a seller and the actual price at which the item was sold.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method, comprising:
   receiving buyer information indicative of a product desired to be purchased by a buyer; searching, by a controller, through a plurality of seller database records associated with products offered for sale by sellers, for a seller database record that corresponds to the buyer information;
   determining, based on the searching, that no seller database record corresponds to the buyer information;
   receiving, after the determination that no seller database record corresponds to the buyer information, additional buyer information defining a commitment of the buyer to purchase the desired product, wherein the additional buyer information is indicative of:
      a quality associated with the desired product; and
      a maximum price that the buyer commits to pay for the desired product;
   creating, after the receiving of the additional buyer information, a new seller database record associated with a specific product offered for sale by a specific seller;
   determining, by the controller, upon the occurrence of a pre-determined event, that the additional buyer information corresponds to the new seller database record; and
   automatically charging the buyer for the specific product.

2. The method of claim 1, wherein the pre-determined event comprises at least one of:
   an elapse of a pre-determined period of time; and
   the creation of the new seller database record.

3. The method of claim 1, wherein the determining that the additional buyer information corresponds to the new seller database record comprises:
   identifying a minimum price associated with the specific product offered for sale by the seller; and
   determining, by the controller, that the minimum price associated with the specific product is less than or equal to the maximum price committed to by the buyer.

4. The method of claim 1, wherein the determining that the additional buyer information corresponds to the new seller database record comprises:
   identifying a minimum price associated with the specific product offered for sale by the seller;
   determining, by the controller, that the minimum price associated with the specific product offered for sale by the seller is greater than the maximum price that the buyer committed to pay; and
   calculating, by the controller, a gap amount by which the minimum price associated with the specific product offered for sale by the seller exceeds the maximum price that the buyer committed to pay.

5. The method of claim 4, further comprising:
   identifying, by the controller, a first amount to be added to the maximum price that the buyer committed to pay, wherein the first amount is equal to or greater than the gap amount.

6. The method of claim 5, further comprising offering to provide the first amount to the buyer.

7. The method of claim 5, further comprising offering to provide the first amount to the seller.

8. The method of claim 1, wherein the additional buyer information is further indicative of:
   a quality class associated with the desired product.

9. The method of claim 8, further comprising:
   providing, to the buyer, based on the quality class associated with the product desired by the buyer, a suggested price for the desired product.

10. The method of claim 9, wherein the suggested price for the desired product comprises a suggested range of prices.

11. The method of claim 8, wherein the determining that the additional buyer information corresponds to the new seller database record comprises:
    identifying a quality class associated with the specific product offered for sale by the seller; and
    determining that the quality classes associated with the specific product offered for sale by the seller and with the product desired by the buyer are equivalent.

12. The method of claim 11, wherein the identification of the quality class associated with the specific product offered for sale by the seller is based on at least one of: (i) a product category, (ii) at least one product feature, (iii) a product retail price, (iv) an age associated with the specific product, (v) a manufacturer of the specific product, (vi) a product description, (vii) a product image, (viii) a product condition, and (ix) an accessory associated with the specific product.

13. The method of claim 11, further comprising: providing, to the seller, based on the quality class associated with the specific product offered for sale by the seller, a suggested price for the specific product.

14. The method of claim 13, wherein the suggested price for the specific product offered for sale by the seller comprises a suggested range of prices.

15. The method of claim 1, wherein the additional buyer information is further indicative of:
   a time limit defining an expiration date of the commitment.

16. The method of claim 1, wherein the additional buyer information is further indicative of:
   a payment identifier associated with the buyer.

17. The method of claim 16, wherein the automatic charging is based upon the payment identifier associated with the buyer.

18. The method of claim 1, further comprising:
   determining whether to perform the determining that the additional buyer information corresponds to the new seller database record.

19. The method of claim 18, wherein the determining whether to perform the determining that the additional buyer information corresponds to the new seller database record is based upon at least one of: (i) a past popularity of the product desired by the buyer, (ii) a current popularity of the product desired by the buyer, and (iii) a predicted future popularity of the product desired by the buyer.

20. The method of claim 18, wherein the determining whether to perform the determining that the additional buyer information corresponds to the new seller database record is based upon at least one of: (i) a past popularity of the specific product offered for sale by the seller, (ii) a current popularity of the specific product offered for sale by the seller, and (iii) a predicted future popularity of the specific product offered for sale by the seller.

21. The method of claim 1, wherein the additional buyer information defines commitments from a plurality of buyers to purchase the desired product, further comprising:
   selecting, by the controller, the buyer from the plurality of buyers.

22. The method of claim 21, wherein the selecting is based upon priority rankings associated with each buyer from the plurality of buyers.

23. The method of claim 22, wherein the priority rankings are based on at least one of: (i) priority payments made by one or more of the buyers from the plurality of buyers, (ii) transaction histories associated with one or more of the buyers from the plurality of buyers, and (iii) a comparison of the new seller database record and the additional buyer information.

24. The method of claim 1, wherein the new seller database record is indicative of a specific product offered for sale by each seller from a plurality of sellers, further comprising:
   selecting, by the controller, the seller from the plurality of sellers.

25. The method of claim 24, wherein the selecting is based upon priority rankings associated with each seller from the plurality of sellers.

26. The method of claim 25, wherein the priority rankings are based on at least one of: (i) priority payments made by one or more of the sellers from the plurality of sellers, (ii) transaction histories associated with one or more of the sellers from the plurality of sellers, and (iii) a comparison of the new seller database record and the additional buyer information.

* * * * *